US008869123B2

(12) United States Patent
Mykland

(10) Patent No.: US 8,869,123 B2
(45) Date of Patent: Oct. 21, 2014

(54) SYSTEM AND METHOD FOR APPLYING A SEQUENCE OF OPERATIONS CODE TO PROGRAM CONFIGURABLE LOGIC CIRCUITRY

(76) Inventor: Robert Keith Mykland, Capitola, CA (US)

(\*) Notice: Subject to any disclaimer, the term of this patent is extended or adjusted under 35 U.S.C. 154(b) by 62 days.

(21) Appl. No.: 13/429,198

(22) Filed: Mar. 23, 2012

(65) Prior Publication Data

US 2012/0331450 A1  Dec. 27, 2012

Related U.S. Application Data

(63) Continuation-in-part of application No. 13/301,763, filed on Nov. 21, 2011, and a continuation-in-part of application No. 13/360,805, filed on Jan. 30, 2012.

(60) Provisional application No. 61/500,619, filed on Jun. 24, 2011.

(51) Int. Cl.
G06F 9/44 (2006.01)
G06F 9/45 (2006.01)

(52) U.S. Cl.
CPC ...................................... *G06F 8/45* (2013.01)
USPC ........................................................ 717/148

(58) Field of Classification Search
CPC ........................................................ G06F 8/45
USPC ........................................................ 717/149
See application file for complete search history.

(56) References Cited

U.S. PATENT DOCUMENTS

| 5,317,743 | A | * | 5/1994 | Imai et al. ...................... 717/160 |
| 5,488,707 | A | * | 1/1996 | Phillips et al. ................. 711/200 |
| 5,822,591 | A | * | 10/1998 | Hochmuth .................... 717/148 |
| 6,438,737 | B1 | | 8/2002 | Morelli et al. |
| 6,717,436 | B2 | | 4/2004 | Kress et al. |
| 6,832,370 | B1 | * | 12/2004 | Srinivasan et al. ............ 717/161 |
| 6,868,017 | B2 | | 3/2005 | Ikeda |
| 6,988,183 | B1 | * | 1/2006 | Wong ............................ 712/208 |
| 7,076,575 | B2 | | 7/2006 | Baitinger et al. |
| 7,155,602 | B2 | | 12/2006 | Poznanovic |
| 7,167,976 | B2 | | 1/2007 | Poznanovic |
| 7,171,659 | B2 | | 1/2007 | Becker et al. |
| 7,840,777 | B2 | | 11/2010 | Mykland |
| 7,840,950 | B2 | | 11/2010 | Stoodley et al. |
| 8,078,849 | B2 | * | 12/2011 | Libby et al. ................... 712/234 |

(Continued)

OTHER PUBLICATIONS

U.S. Appl. No. 13/301,763, Nov. 21, 2011, Robert Mykland.

*Primary Examiner* — Don Wong
*Assistant Examiner* — Theodore Hebert
(74) *Attorney, Agent, or Firm* — Patrick Reilly

(57) ABSTRACT

A method and system are provided for deriving a resultant software program from an originating software program that may include overlapping branch logic. The method may include deriving a plurality of software objects from a sequence of processor instructions; associating software objects in accordance with an original logic of the sequence of processor instructions; determining and resolving memory precedence conflicts within the associated plurality of software objects; de-overlapping the execution of the associated plurality of software objects by replacing all overlapping branch logic instructions of the associated series of software objects with equivalent and non-overlapping branch logic instructions; and/or applying the de-overlapped associated plurality of software objects in a programming operation by a parallel execution logic circuitry. The resultant software is more easily converted into programming reconfigurable logic than the originating software program, computers or processors, or by means of a computer or a communications network.

20 Claims, 25 Drawing Sheets

(56) References Cited

U.S. PATENT DOCUMENTS

| | | |
|---|---|---|
| 2004/0019765 A1 | 1/2004 | Klein, Jr. |
| 2004/0068329 A1 | 4/2004 | Mykland |
| 2004/0107331 A1 | 6/2004 | Baxter |
| 2006/0004997 A1* | 1/2006 | Mykland ............ 712/244 |
| 2008/0005498 A1* | 1/2008 | Lujan Moreno et al. ..... 711/154 |
| 2009/0119654 A1* | 5/2009 | Kawahito et al. ............ 717/154 |
| 2011/0113411 A1* | 5/2011 | Yonezu ............ 717/153 |
| 2012/0096444 A1* | 4/2012 | Wright et al. ............ 717/137 |
| 2012/0331450 A1* | 12/2012 | Mykland ............ 717/149 |

* cited by examiner

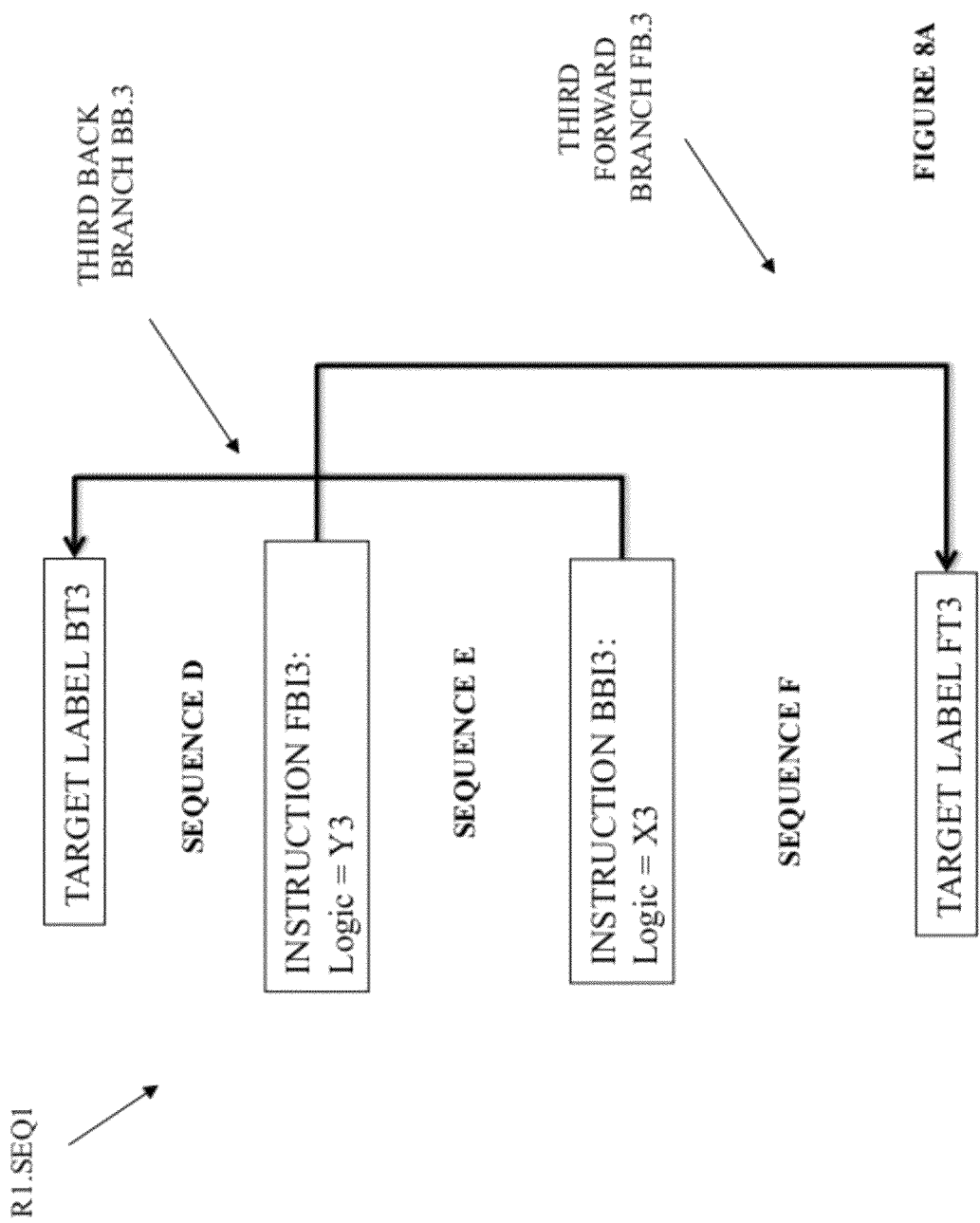

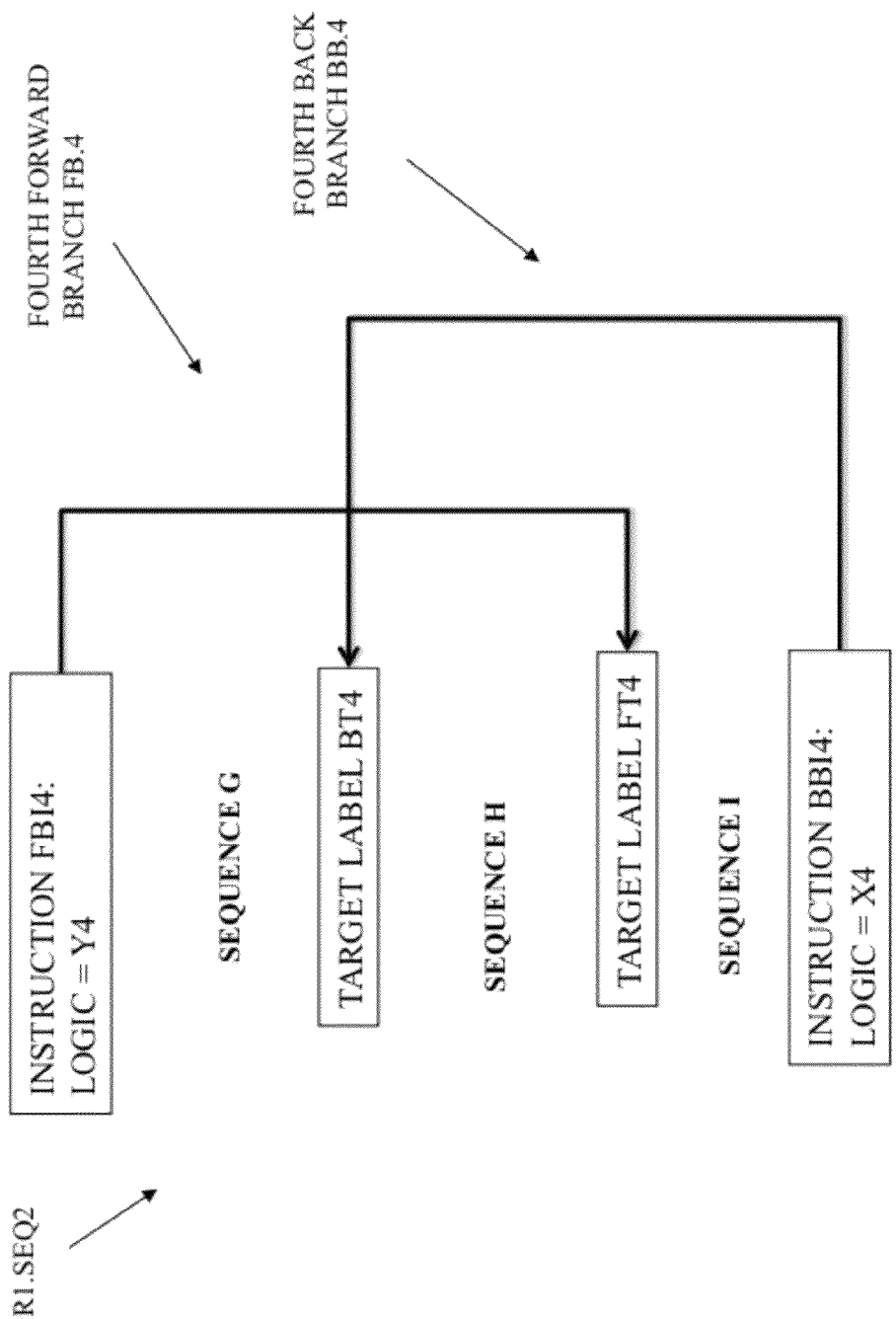

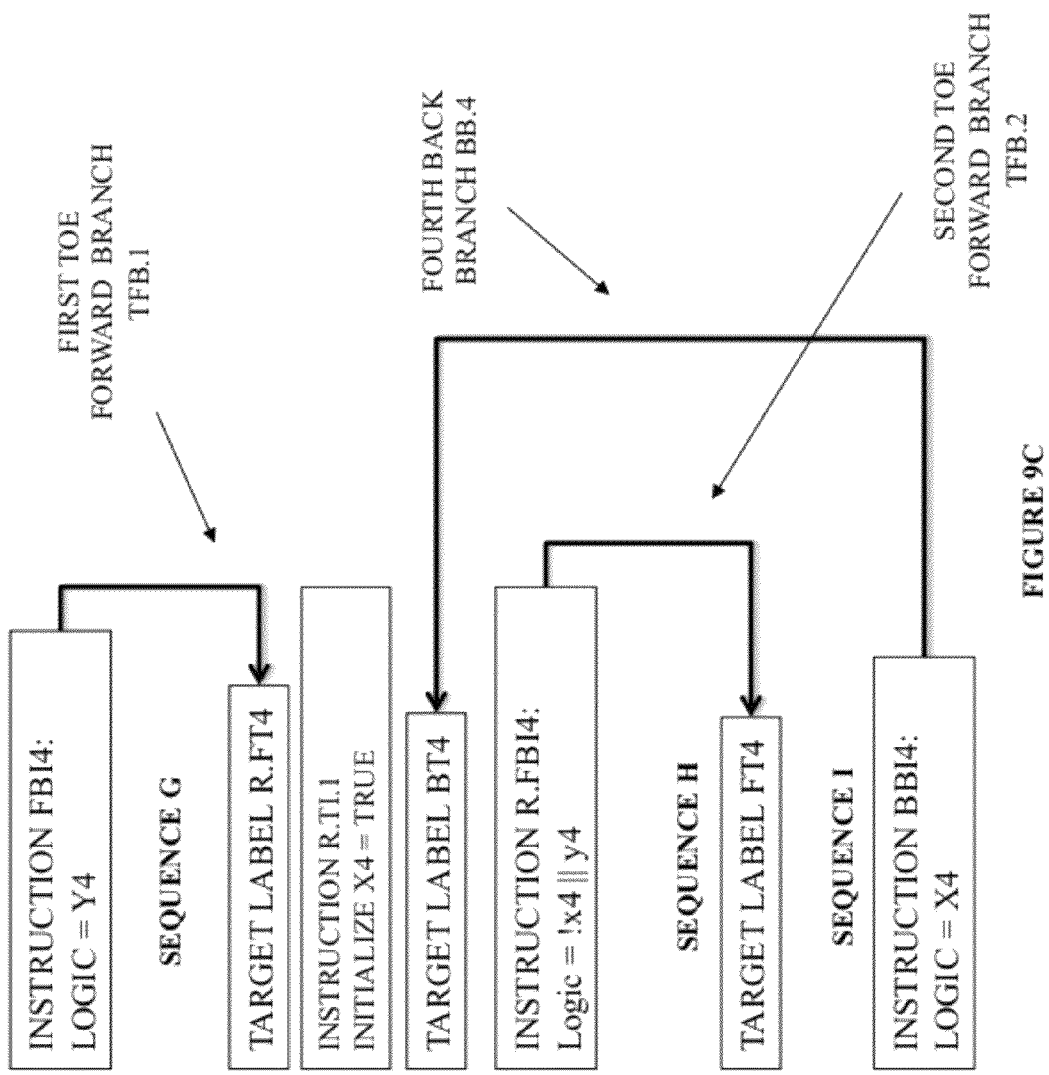

SYSTEM AND METHOD FOR APPLYING A SEQUENCE OF OPERATIONS CODE TO PROGRAM CONFIGURABLE LOGIC CIRCUITRY

CO-PENDING PATENT APPLICATIONS

This Nonprovisional Patent application is a Continuation-in-Part Application to Nonprovisional patent application Ser. No. 13/301,763, filed on Nov. 21, 2011 by inventor Robert Mykland and titled "CONFIGURABLE CIRCUIT ARRAY". Nonprovisional patent application Ser. No. 13/301,763 is hereby incorporated by reference in its entirety and for all purposes, to include claiming benefit of the priority date of filing of Nonprovisional patent application Ser. No. 13/301,763.

This Nonprovisional Patent Application is also a Continuation-in-Part Application to Nonprovisional patent application Ser. No. 13/360,805, filed on Jan. 30, 2012 by inventor Robert Mykland and titled "SYSTEM AND METHOD FOR COMPILING MACHINE-EXECUTABLE CODE GENERATED FROM A SEQUENTIALLY ORDERED PLURALITY OF PROCESSOR INSTRUCTIONS". Nonprovisional patent application Ser. No. 13/360,805 is hereby incorporated by reference in its entirety and for all purposes, to include claiming benefit of the priority date of filing of Nonprovisional patent application Ser. No. 13/360,805.

In addition, this Nonprovisional Patent application is a Continuation-in-Part Application to Provisional Patent Application Ser. No. 61/500,619, filed on Jun. 24, 2011 by inventor Robert Mykland. Provisional Patent Application Ser. No. 61/500,619 is hereby incorporated by reference in its entirety and for all purposes, to include claiming benefit of the priority date of filing of Provisional Patent Application Ser. No. 61/500,619.

FIELD OF THE INVENTION

The present invention relates to software directed information technology. More particularly, the present invention relates to methods of and systems for modifying software code for application with electronic logic capable of parallel configuration, programming and/or execution.

BACKGROUND OF THE INVENTION

The prior art provides software programs that consist of sequences of machine-executable commands that may be executed by a conventional, general purpose computer that may allow for and includes logical branching. However the use of software designed to be sequentially executed line-line by a sole central processor or arithmetic logic unit may not allow for a more efficient operation possible by the special class of computational devices that may be configured, programmed and/or executed with parallel logic processing There is therefore a long-felt need to provide methods and systems that enable a conversion of an originating software program into a resultant software program that supports a more efficient operation, configuration, reconfiguration, programming and/or reprogramming made possible by computational devices having parallel processing capability.

SUMMARY AND OBJECTS OF THE INVENTION

It is an object of the method of the present invention (hereinafter "invented method") to provide a method and a system that enable the conversion of an originating software program into a resultant software program, wherein the resultant software program may be applied by a logic circuit that is capable of performing parallel computation.

Towards these objects and other objects that will be made obvious in light of this disclosure, a first version of the invented method provides a method and a system that modifies a plurality of software encoded instructions to generate a resultant software program that may be executed by logic circuitry that is at least partially enabled to execute instructions in parallel. In one optional aspect of the invented method, one o more machine-executable instruction, e.g., and opcode, may be modeled by one or more software objects.

In one aspect of the method of the present invention, a source program comprising a sequential series of software-encoded instructions, e.g., a sequence of processor-executable opcodes, is modeled by a plurality of software objects organized as an ordered list. One or more software objects of the ordered list of software objects (hereinafter, "the ordered list") may be grouped within one or more software containers that each provide a logical equivalent of a particular function of the source program. Data dependencies of the source program execution flow may be modeled within the ordered list by associations of individual or groups of software objects. Memory dependencies may also be modeled within the ordered list by associations of individual or groups of software objects.

After data dependencies and memory dependencies of the source program are modeled by associations of the ordered list, the ordered list may be further associated to remove logical pathways that would or might generate overlapping branches upon execution or instantiation of a machine-executable code that is derived from the ordered list. In particular, additional associations may be introduced among the plurality of software objects of the ordered list that avoid any logical flow that might generate overlapping branch logic while still enabling the original logic of the source program. Furthermore, certain earlier formed associations found among the plurality of software objects of the ordered list may be deleted or modified to further support a formation of a logical structure within the ordered list that provides logic equivalent to the source program but does not impose overlapping branch logic.

After data dependencies and memory operation dependencies are modeled in the ordered list, and some or all associations of the ordered list that might create overlapping branch are replaced with associations that form an equivalent logic structure, the software objects of the ordered list may be serialized and then compiled into a machine-executable code sequence. The compiled machine-executable code may then be introduced to a target device for the purposes of (a.) execution of the complied code by the target device; (b.) programming of the target device; (c.) configuration or reconfiguration of the target device; and/or (d.) generation of logic circuitry in accordance with the logic of the sequence of opcodes.

In an additional optional aspect of the invented method, a computational system having reconfigurable logic, and/or an information technology network that comprises reconfigurable logic, is provided that accepts and executes the resultant software code derived in accordance with one or more of the recited aspects of the invented method.

In certain still alternate preferred embodiments of the invented method, some or all of an array of reconfigurable logic circuits are communicatively or bi-directionally communicatively coupled to a memory, a back buffer, and one or more memory controllers.

Additionally or alternately, the invented method provides a reprogrammable logic unit as disclosed in U.S. Pat. No. 7,840,777 issued on Nov. 23, 2010 to inventor Robert Mykland and titled "Method and apparatus for directing a computational array to execute a plurality of successive computational array instructions at runtime" and a method of programming thereof.

Still additionally or alternately, the invented method provides a reprogrammable logic unit as disclosed in U.S. Nonprovisional patent application Ser. No. 13/301,763 filed on Nov. 21, 2011 to inventor Robert Mykland and titled "CONFIGURABLE CIRCUIT ARRAY" and a method of programming thereof.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include U.S. Pat. No. 8,078,849 (inventors: Libby, et al.; issued on Dec. 13, 2011) titled "Fast execution of branch instruction with multiple conditional expressions using programmable branch offset table"; U.S. Pat. No. 7,840,950 (titled Stoodley, et al.; issued on Nov. 23, 2010) titled "Programmatic compiler optimization of glacial constants"; U.S. Pat. No. 7,840,777 (inventor: Mykland; issued on Nov. 23, 2010) titled "Method and apparatus for directing a computational array to execute a plurality of successive computational array instructions at runtime"; U.S. Pat. No. 6,438,737 (inventors: Morelli, et al.; issued on Aug. 20, 2002) titled "Reconfigurable logic for a computer"; U.S. Pat. No. 7,171,659 (inventors: Becker, et al.; issued on Jan. 30, 2007) titled "System and method for configurable software provisioning"; U.S. Pat. No. 7,167,976 (inventor: Poznanovic, D.; issued on Jan. 23, 2007) titled "Interface for integrating reconfigurable processors into a general purpose computing system"; U.S. Pat. No. 7,155,602 (inventor: Poznanovic, D.; issued on Dec. 26, 2006) titled "Interface for integrating reconfigurable processors into a general purpose computing system"; U.S. Pat. No. 7,076,575 (inventor: Baitinger, et al.; issued on Jul. 11, 2006) titled "Method and system for efficient access to remote I/O functions in embedded control environments"; U.S. Pat. No. 6,868,017 (inventor: Ikeda, K.; issued on Mar. 15, 2005) titled "Integrated circuit device"; and U.S. Pat. No. 6,717,436 (inventors: Kress, et al.; issued on Apr. 6, 2004) titled "Reconfigurable gate array".

Such incorporations further include in U.S. Nonprovisional patent application Ser. No. 13/301,763 filed on Nov. 21, 2011 to inventor Robert Mykland and titled "CONFIGURABLE CIRCUIT ARRAY"; US Patent Appn. Publication Ser. No. 20060004997 (inventor: Mykland, Robert; published on Jan. 5, 2006) titled "Method and apparatus for computing"; US Patent Appn. Publication Ser. No. 20040068329 (inventor: Mykland, Robert; published on Apr. 8, 2004) titled "Method and apparatus for general purpose computing"; US Patent Appn. Publication Ser. No. 20040019765 (inventor: Klein, Robert C. JR.; published on Jan. 29, 2004) titled "Pipelined reconfigurable dynamic instruction set processor"; and US Patent Appn. Publication Ser. No. 20040107331 (inventor: Baxter, Michael A.; published on Jun. 3, 2004) titled "Meta-address architecture for parallel, dynamically reconfigurable computing".

In addition, each and all publications, patents, and patent applications mentioned in this specification are herein incorporated by reference to the same extent in their entirety and for all purposes as if each individual publication, patent, or patent application was specifically and individually indicated to be incorporated by reference. The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of the invention, may be better understood with reference to the accompanying specification and drawings depicting the preferred embodiment, in which:

FIG. 8A is a detail view of an exemplary owner pattern of the first resultant code and/or the source program of FIG. 1F;

FIG. 9A is a detail view of an exemplary toe pattern of the first resultant code and/or the source program of FIG. 1F;

FIG. 9C is a representation of the toe set generated by the method of FIG. 9B as written into the second resultant software of FIG. 1F;

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
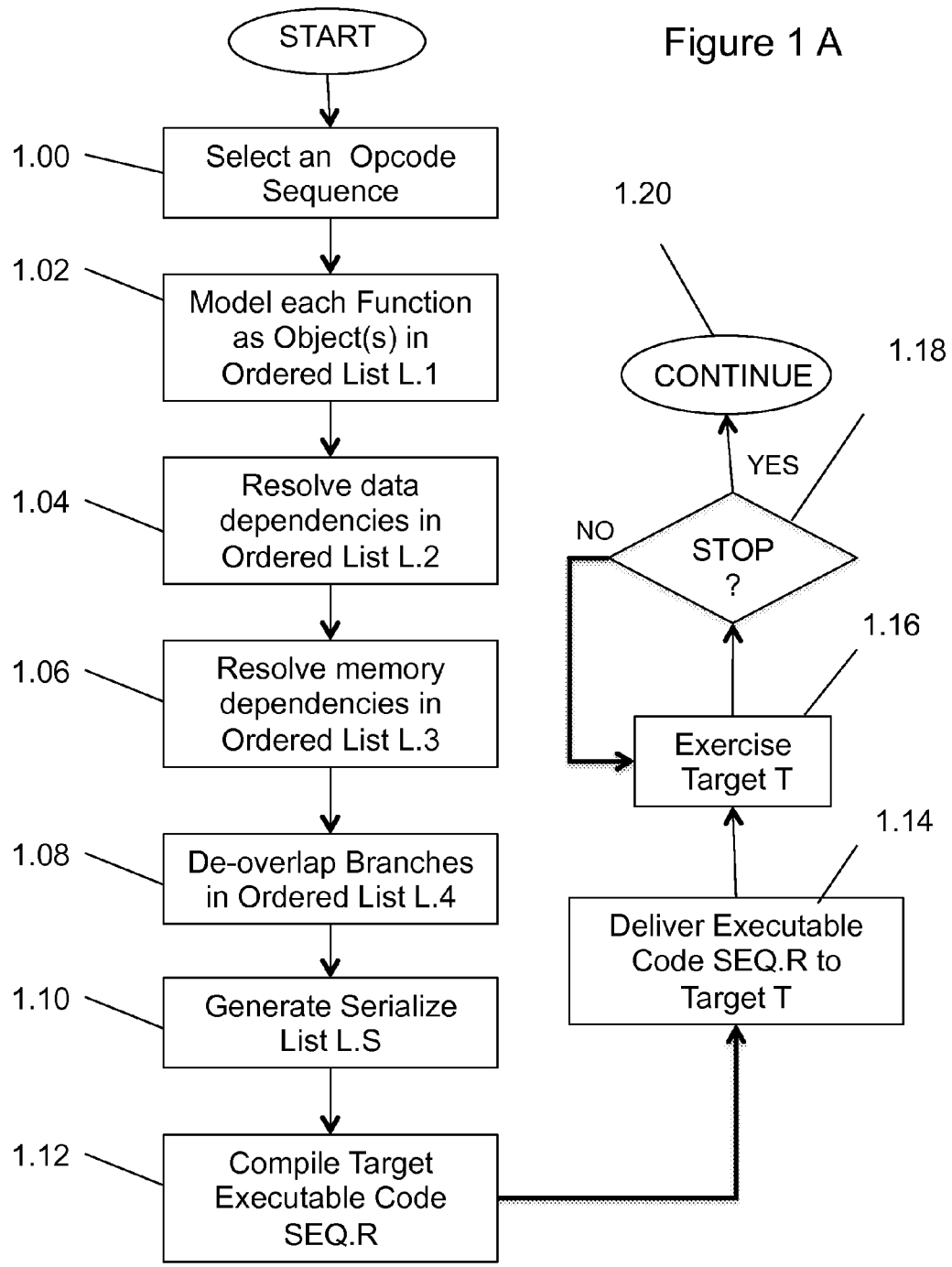
FIG. 1A is an illustration of a first aspect of the invented method, wherein an ordered list of software objects is derived from a source program and is then compiled to generate a sequence machine-executable instructions.
FIG. 1B is a flowchart of an aspect of the invented method that enables building a plurality of software objects that are structured and associated to logically model certain functions of the source program of FIG. 1A.
FIG. 1C is a flowchart of another aspect of the invented method that enables the introduction of data dependencies into the associations of the plurality of software objects of FIG. 1B in order to model the data dependencies of the source program in an ordered list of software objects.
FIG. 1D is a flowchart of a still other aspect of the invented method that enables replicating a branch logic of the source program into the association of the ordered list of software objects of FIGS. 1B and 1C.
FIG. 1E is a flowchart of a yet other aspect of the invented method that enables the inclusion of memory dependencies of the source program into the associations of the ordered list of software objects of FIGS. 1B, 1C and 1D.
FIG. 1F is a functional block diagram of a prior art computational device having a processor module 2A communicatively coupled with a memory module, a network interface, one or more input modules and one or more output modules.

Referring now generally to the Figures and particularly to FIG. 1A, FIG. 1A is an illustration of a first aspect of the invented method that may be implemented by a computer 2 in concert with a target circuit T, and/or a reconfigurable computer 4. Steps 1.00 through 1.10 and 1.20 may be performed by a processor module 2A of the computer 2 and/or the reconfigurable computer 4 in concert with the target circuit T, and steps 1.14 and 1.12 may be executed in by the computer 2 and/or the reconfigurable computer 4 in isolation or in collaboration.

For the sake of explanatory clarity, the processes of FIGS. 1A through 1E will be generally discussed as being executed by the computer 2, however it is understood that one or more computers 2 and/or reconfigurable computers 4 may be applied to execute various steps and aspects of the invented method.

In step 1.00 the processor module 2A selects or receives or acquires a sequence of machine-executable operations code SEQ.0 (hereinafter, "sequence of opcodes" SEQ.0). In step 1.02 each opcode, or selected opcodes and functions of the sequence of opcodes SEQ.0, is partially modeled by one or more a software objects O.1-O.N, OF.1-OF.N & O.CON.1-O.CON.N by the computer 2 by forming and populating a first ordered list L.1 of software objects O.1-O.N by a process described in FIG. 1B. It is understood that one or more software objects O.1-O.N, function objects OF.1-OF.N and function object containers O.CON.1-O.CON.N of each ordered list L.1-L.4 may be generated in various aspects of the invented method.

In steps 1.04 through 1.08 the plurality of software objects O.1-O.N generated in step 1.02 is modified and associated within ordered lists L.1-L.4 in to order to more alternately or preferably model the logic of the sequence of opcodes SEQ.0. In step 1.04 the computer 2 accounts for and replicates data dependencies of the opcode sequence SEQ.0 within the first ordered list L.1 by a process described in FIGS. 1C and 1D and thereby generates a second ordered list L.2. In step 1.06 the computer 2 generates a third ordered list L.3 of software objects O.1-O.N that accounts for and replicates memory dependencies of the opcode sequence SEQ.0 within the second ordered list L by a process described in FIG. 1E. In step 1.08 the computer 2 de-overlaps the branch logic of the sequence of opcodes SEQ.0 as expressed in the logic and object associations of the third ordered list L.3 to generate a fourth ordered list L.4. A preferred technique of generating the fourth ordered list L.4 as taught in step 1.08 by derivation from the third ordered list L.3 is disclosed herein by analogy in FIGS. 3 through 12 and accompanying text.

The fourth ordered list L.4 is serialized in step 1.10 to form a serialized ordered list L.S of software objects O.1-O.N as modified by steps 1.00 through 1.08. The serialized ordered list L.S is then complied in step 1.12 by input of the serialized ordered list L.S into the compiler Sw.4 wherein a resultant sequence of instructions SEQ.R is generated. The resultant sequence of instructions SEQ.R generated in step 1.12 (hereinafter "the resultant sequence" SEQ.R) is then delivered to the target circuit T in step 1.14. The compiler SW.4 is selected and adapted to generate resultant code, e.g., the resultant sequence of instructions SEQ.R, that comprises machine-code that may be executed by the target circuit T, or processed by the target circuit T into machine-code that is executable by the target circuit T.

Depending upon the nature and design of the of the target circuit T and the informational content of the resultant sequence SEQ.R, the resultant sequence SEQ.R may be applied in step 1.16 to or by the target circuit to (a.) execute the instructions of the resultant sequence SEQ.R; (b.) program logic circuits or devices; (c.) configure or reconfigure logic circuits or devices; and/or (d.) generate or affect a structure of logic circuitry.

The processor module 2A then determines whether to continue exercising the target circuit T in step 1.18 or to proceed on to alternate computational processes in step 1.20.

Figure 1B:
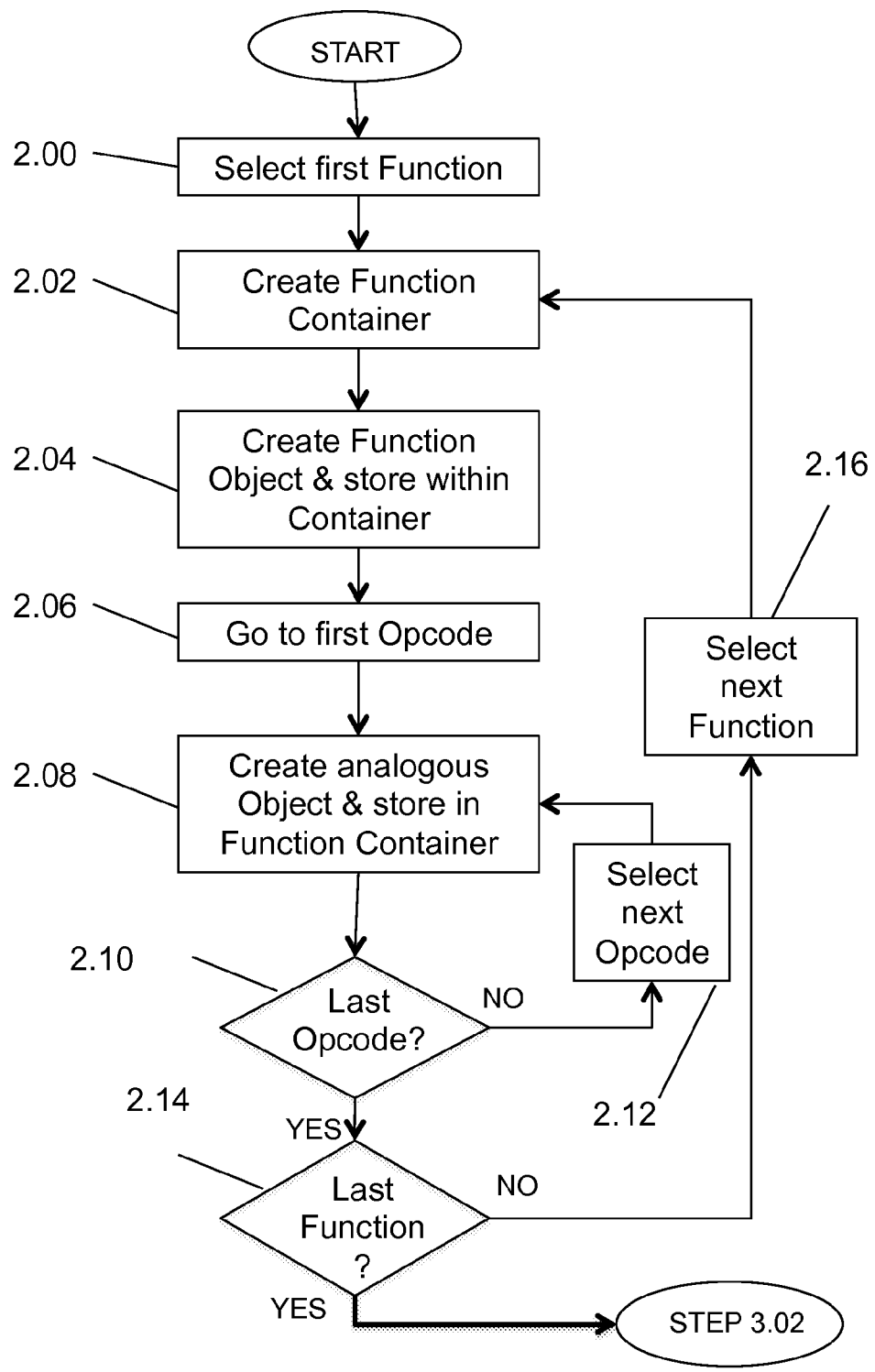

Referring now generally to the Figures and particularly to FIG. 1B, FIG. 1B is a flowchart of an aspect of the invented method that enables building the plurality of software objects O.1-O.N of the first ordered list L.1 to be sequentially applicable to model the logic of the opcode sequence SEQ.0 selected in step 1.00 of the process of FIG. 1A. In step 2.00 the processor module 2A selects a first occurring function of the sequence of opcodes SEQ.0 to be modeled by one or more software objects O.1-O.N. A function object container O.CON.1-O.CON.N is created step 2.02. In step 2.04 a function object OF.1-OF.N that models the selected function is created and stored within the instant function F.CON.1-F.CON.N container created in the most recent execution of step 2.02. A first opcode of the opcode sequence function selected in step 2.00, or in a succeeding and most recent execution of step 2.16, is then selected in step 2.06, and in step 2.08 a software object O.1-O.N is formed and associated, or selected from the plurality of software objects O.1-O.N and associated, to be logically equivalent to the relevant opcode. The software object O.1-O.N is both (a.) created or selected and (b.) stored in step 2.08 in the most recently created function object container F.CON.1-F.CON.N of step 2.04. The processor module 2A executes the loop 2.08 through 2.12 until a logically equivalent and/or analogous software object O.1-O.N corresponding each and every opcode of the instant function of the opcode sequence SEQ.0 is created and stored in the function object container F.CON.1-F.CON.N created or selected in the most recent execution of step 2.04. The processor module 2A further proceeds through the loop defined from steps 2.02 through 2.16 until each and every opcode and each and every function of the sequence of opcodes SEQ.0 is modeled by an individual software object O.1-O.N of the plurality of software objects O.1-O.N of the listing L. The processor module 2A proceeds from step 2.14 to step 3.02 of FIG. 1C when the generation of the software objects O.1-O.N modeling each opcode of the opcode sequence SEQ.0 is complete.

It is understood that (a.) a unique and distinguishable function object container O.CON.1-O.CON.N is created in each execution of 2.02; and (b.) a unique and distinguishable function object OF.1-OF.N is created in each execution of 2.04.

Figure 1C:
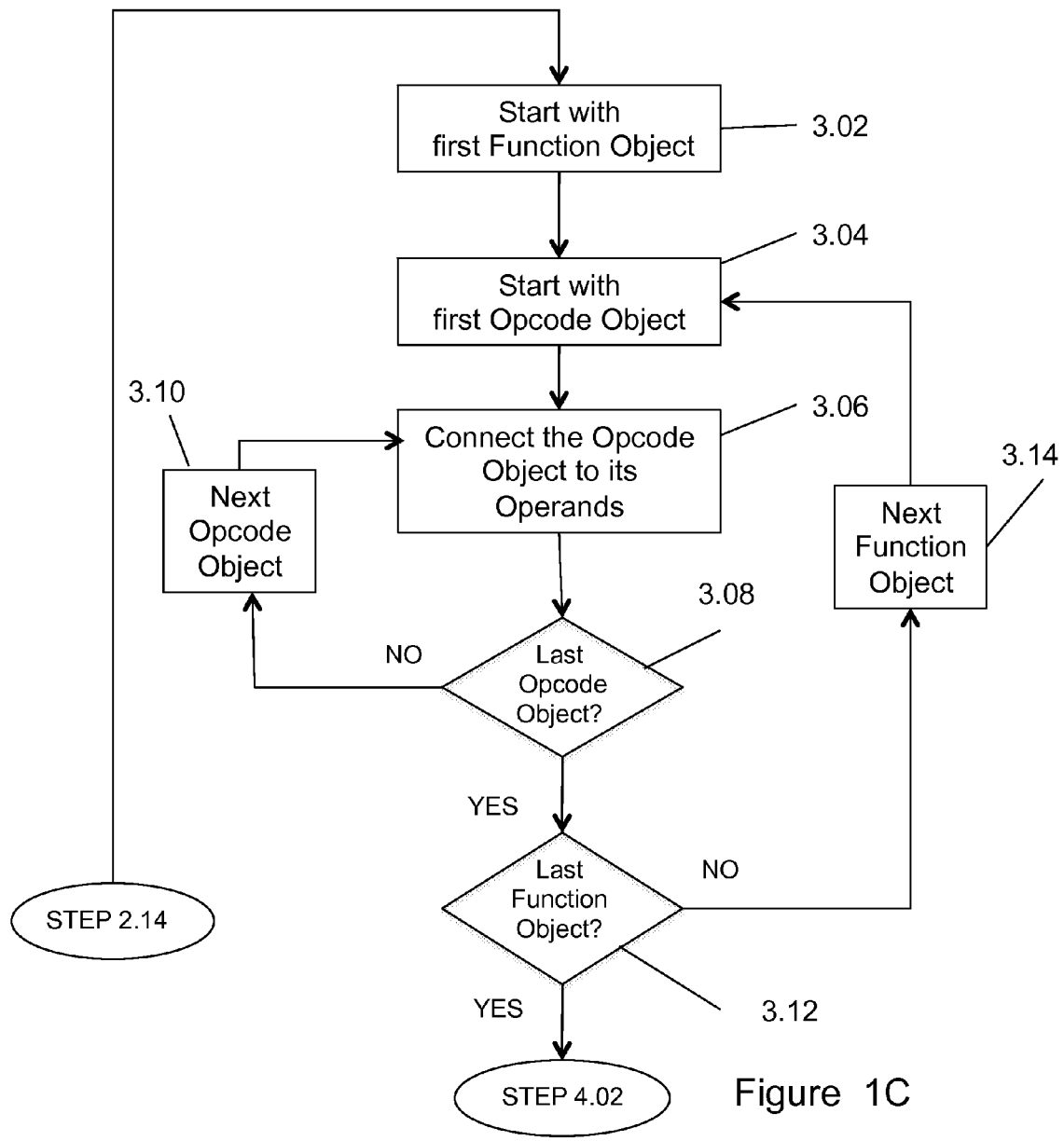
Figure 1D:
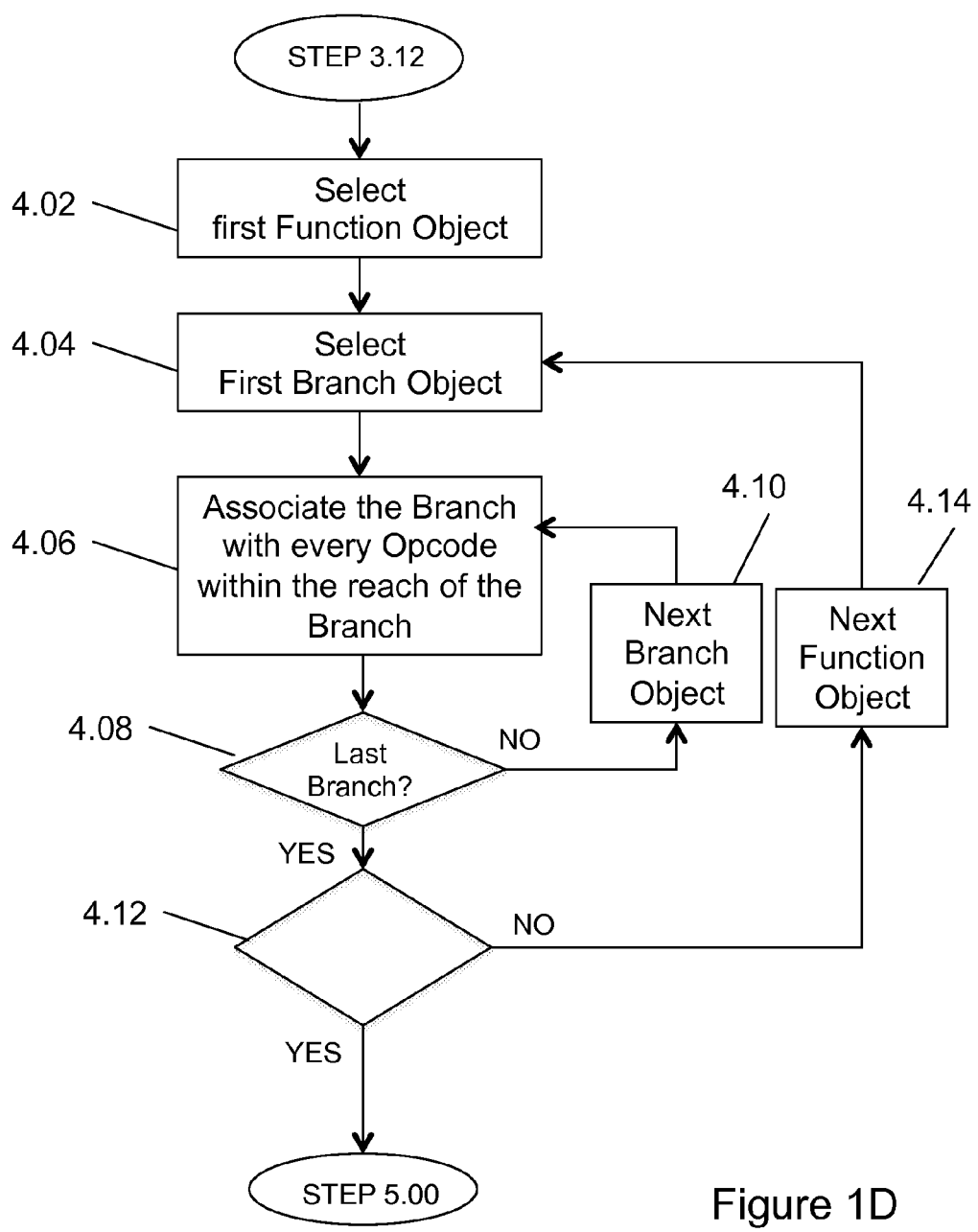

Referring now generally to the Figures and particularly to FIG. 1C and FIG. 1D, FIG. 1C and FIG. 1D are sequential flowcharts disclosing another aspect of the invented method that enables a generation of a second ordered list L.2 of software objects O.1-O.N by the introduction of data dependencies into the associations of software objects O.1-O.N of the second ordered list L.2. The processor module 2A selects an exemplary first function object OF.1 in step 3.02 and selects a first opcode object O.1-O.N of the first function object OF.1 in step 3.04, whereupon one or more operands of the selected opcode object O.1-O.N are connected in step 3.06. The processor module 2A executes the loop of step 3.06 through 3.10 until each and every opcode object O.1-O.N of the instant function object OF.1 is connected to its own operands. The processor module 2A further executes the loop of steps 3.04 through 3.12 until each function object OF.1-OF.N created in each execution of step 2.04 has been modified to cause each and every opcode object O.1-O.N of the each function object OF.1-OF.N to be connected to its own operand(s). The processor module 2A proceeds from step 2.12 to step 4.02 of FIG. 1D when the generation of the connection of each and every object O.1-O.N to its own operand s) is complete.

Referring now generally to the Figures and particularly to FIG. 1D, in step 4.02 the processor module 2A selects a first function object OF.1 and selects (if any) a first branch object O.B1-O.BN 0.1-O.N from the selected function object OF.1. It is understood that the plurality of branch objects OB.1-OB.N are a subset of the plurality of objects O.1-O.N.

The processor module 2A then selects the instant branch object O.B1-O.BN with every opcode associated within a reach of the incident branch. The processor module 2A repeats the loop of 4.06 through 4.10 as necessary until each object O.1-O.N within the reach of each branch object O.B1-O.BN of the most recently selected function object OF.1-OF.N is associated with the relevant branch object O.B1-O.BN. The processor module 2A further executes the loop of steps 4.04 through 4.14 until the loop of steps 4.06 through 4.10 is applied to each branch object O.B1-O.BN of each function object OF.1-OF.N. The processor module 2A proceeds from step 4.12 to step 5.00 of FIG. 1E after the loop of steps 4.06 through 4.10 is applied to each branch object O.B1-O.BN of each associated function object OF.1-OF.N.

Figure 1E:
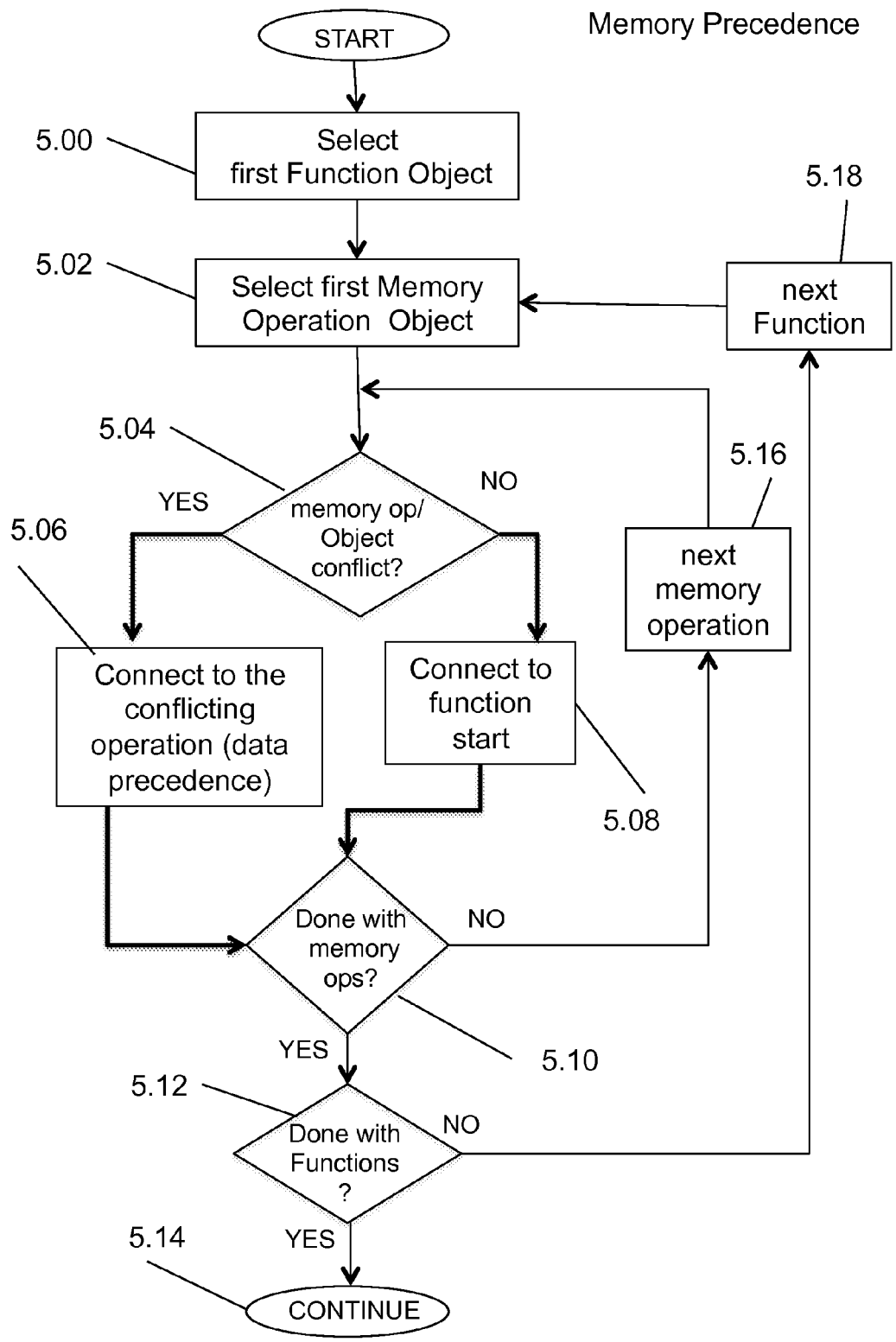

Referring now generally to the Figures and particularly to FIG. 1E, FIG. 1E is a flowchart of a yet other aspect of the invented method that enables a generation of the third ordered list L.3 by the inclusion of memory dependencies of the sequence of opcodes SEQ.0 into the associations of the plurality of software objects O.1-O.N of the second ordered list L.2. In step 5.00 a first function object OF.1 is selected and then each memory operation object OM.1-OM.N of the first function object OF.1 is selected sequentially and each conflict of an object O.1-O.N with a memory operation determined to exist by the processor module 2A is resolved by connecting each instant object O.1-O.N with the relevant conflicting memory operation, as per step 5.06. It is understood that the plurality of memory objects OB.1-OB.N are a subset of the plurality of objects O.1-O.N.

The loop of steps 5.04 through 5.10 is applied to the first function object OF.1 until all memory operation conflicts are resolved in the associations of the first function object OF.1. The processor module 2A proceeds from step 5.10 to step 5.12 and to perform the loop of steps 5.02 to step 5.12 to resolve each and every memory operation conflict in each and every function object OF.1-OF.N by creating associations of the plurality of software objects O.1-O.N between related software objects O.1-O.N and memory operations. When each and every memory operation conflict of the sequence of opcodes SEQ.0 is resolved in the associations of the plurality of software objects O.1-O.N, the processor module 2A proceeds on to generate the fourth ordered list L.4 by modifying the third ordered list L.3 by removing overlapping branches and associating the and modifying the software objects O.1-O.N with an equivalent logic that does not form overlapping branches as disclosed in reference FIGS. 3 through 12.

Figure 1F:
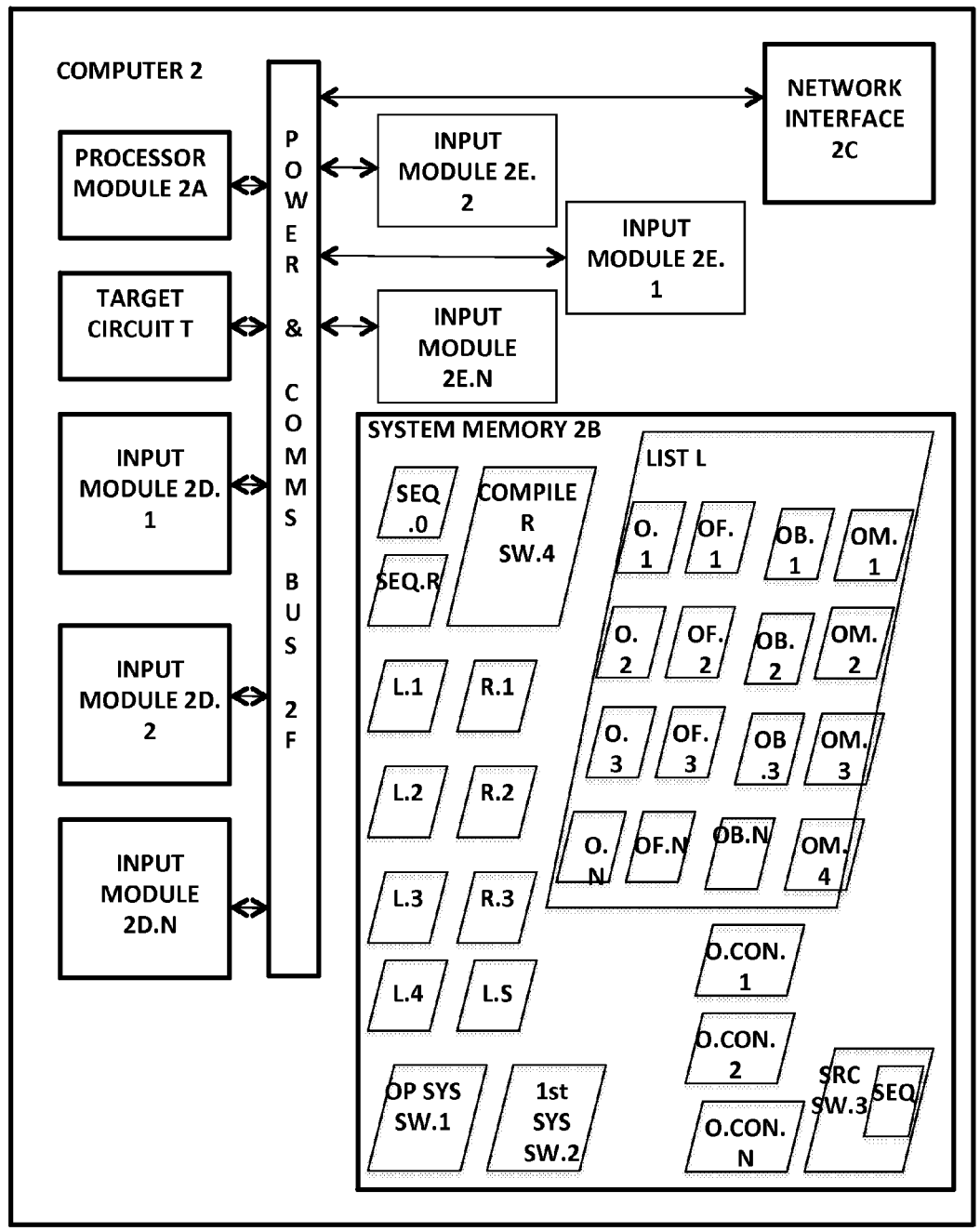

FIG. 1F is a functional block diagram of the prior art computational device 2 (hereinafter "computer" 2) having the processor module 2A communicatively coupled with a memory module 2B, a network interface 2C, one or more input modules 2D.1-2D.N and one or more output modules 2E.1-2E.N. The processor module 2A may comprise one or more digital electronic microprocessors, such as, but not limited to, a CORE 17 Extreme Processor™ processor or a NEHALEM™ processor as marketed by Intel Corporation of Santa, or other suitable electronic logic processors known in the art.

The computer 2 may be (a.) a network-communications enabled SUN SPARCSERVER™ computer workstation marketed by Sun Microsystems of Santa Clara, Calif. running LINUX™ or UNIX™ operating system; (b.) a network-communications enabled personal computer configured for running WINDOWS XP™, VISTA™ or WINDOWS 7™ operating system marketed by Microsoft Corporation of Redmond, Wash.; (c.) a VAIO FS8900™ notebook computer marketed by Sony Corporation of America, of New York City, N.Y.; (d.) a PowerBook G4™ personal computer as marketed by Apple, Inc. of Cupertino, Calif.; (e.) an IPAD™ tablet computer as marketed by Apple, Inc. of Cupertino, Calif.; (f.) an IPHONE™ cellular telephone as marketed by Apple, Inc. of Cupertino, Calif.; or (g.) an other suitable computational device known in the art.

A bi-directional internal communications bus 2F communicatively couples and provides electrical power to the processor module 2A with the memory module 2B, the network interface 2C, the input modules 2D.1-2D.N and the output modules 2E.1-2E.N.

One or more input modules 2D.1-2D.N may be or comprise a computer keyboard, a computer mouse, a point and click selection device, a track ball, a mouse pad, an external disk drive module, a memory stick and/or other suitable user input or data input devices known in the art. One or more output modules 2E.1-2E.N may be or comprise a display device having a display screen, a touch screen, a portable memory module and/or other suitable data output devices known in the art.

The network interface 2C is adapted to bi-directionally communicatively couple the computer 2 with an electronic communications network 3, such as the Internet, a computer network and/or a telephony network. It is understood that the network interface 2C may be adapted to provide wireless bi-directional communication between the computer 2 and the electronic communications network 3.

The system memory 2B stores an operating system SW.1, a first system software SW.2, an originating software program SW.3, the sequence of opcodes SEQ.0, a compiler SW.4, the plurality of software objects O.1-O.N., the plurality of ordered lists L.1-L.3 & L.S and a plurality of resultant software programs R.1-R.N & SEQ.R. It is understood that the originating software program SW.3 may be or comprise the sequence of opcodes SEQ.0.

The operating system SW.1 directs the operations of computer 2, controlling and scheduling the execution of other programs, and managing storage, input/output actions, and communication resources, and may be or comprise a LINUX™ or UNIX™ or derivative operating system, such as the DEBIAN™ operating system software as provided by Software in the Public Interest, Inc. of Indianapolis, Ind.; a WINDOWS XP™, VISTA™ or WINDOWS 7™ operating system as marketed by Microsoft Corporation of Redmond, Wash.; a MAC OS X operating system or iPhone G4 OS™ operating system as marketed by Apple, Inc. of Cupertino, Calif.; or an other suitable operating system known in the art.

The first system software SW.2 provides machine executable instructions to cause and enable the computer 2 to instantiate the aspects of the invented method as disclosed herein. The originating source software program SW.3 (hereinafter "source program" SW.3) is a sequential series of instructions 4000-4999 SEQ upon which one or more aspects of the invented method may be applied by the computer 2 to generate each of the plurality of resultant software programs R.1-R.N & SEQ.R (hereinafter "resultant code" R.1-R.N & SEQ.R and intermediate ordered lists L.1-L.4 & L.S. It is understood that the term "source program" as used within the present disclosure indicates machine-executable software code and does not refer to higher-level source code programs or source programming languages.

Figure 2:
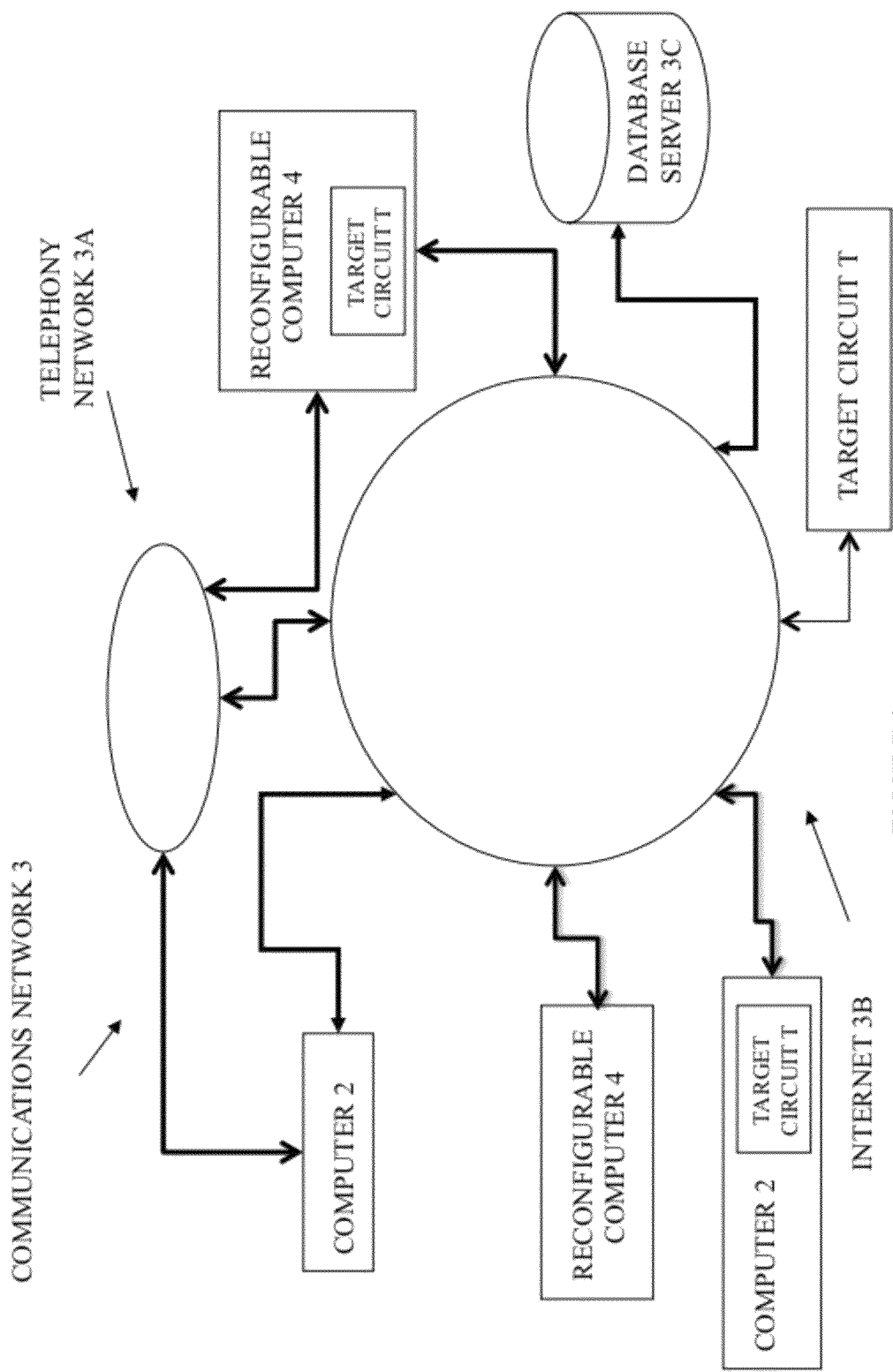
FIG. 2 is an information technology network that comprises at least one prior art computational device of FIG. 1F.

FIG. 2 is a schematic diagram of the electronics communications network 3 (hereinafter "network" 3) that may comprises the computer 2, the reconfigurable computer 4 and/or the target circuit T.

Additionally or alternatively, one or more computers 2 or reconfigurable computers 4 may comprise a target circuit T.

The network 3 is an information technology network that may additionally comprise a telephony network 3A and/or the Internet 3B. The network 3 may further comprise a database server 3C, wherein the database server 3C may include one or more elements 2A-4D or aspects of the computer 2 and/or the reconfigurable computer 4.

It is understood that one or more of the aspects of the invented method may be executed in singularity, in concert, or in combination by one or more computer 2, reconfigurable computer 4 and/or database server 3C.

The reconfigurable computer may be or comprise a configurable circuit array as disclosed and enabled in Nonprovisional patent application Ser. No. 13/301,763, or other suitable configurable, programmable, reconfigurable and/or reprogrammable processing device or circuit known in the art.

It is further understood that computer 2, reconfigurable computer 4 and/or database server 3C may be applied to derive or generate one or more ordered lists L.1-L.4 & L.S, resultant codes R.1-R.N & SEQ.R by the application of various aspects of the invented method from the source program SW.3, sequence of opcodes SEQ.0 or another resultant code R.1-R.N & SEQ.R.

Figure 3:
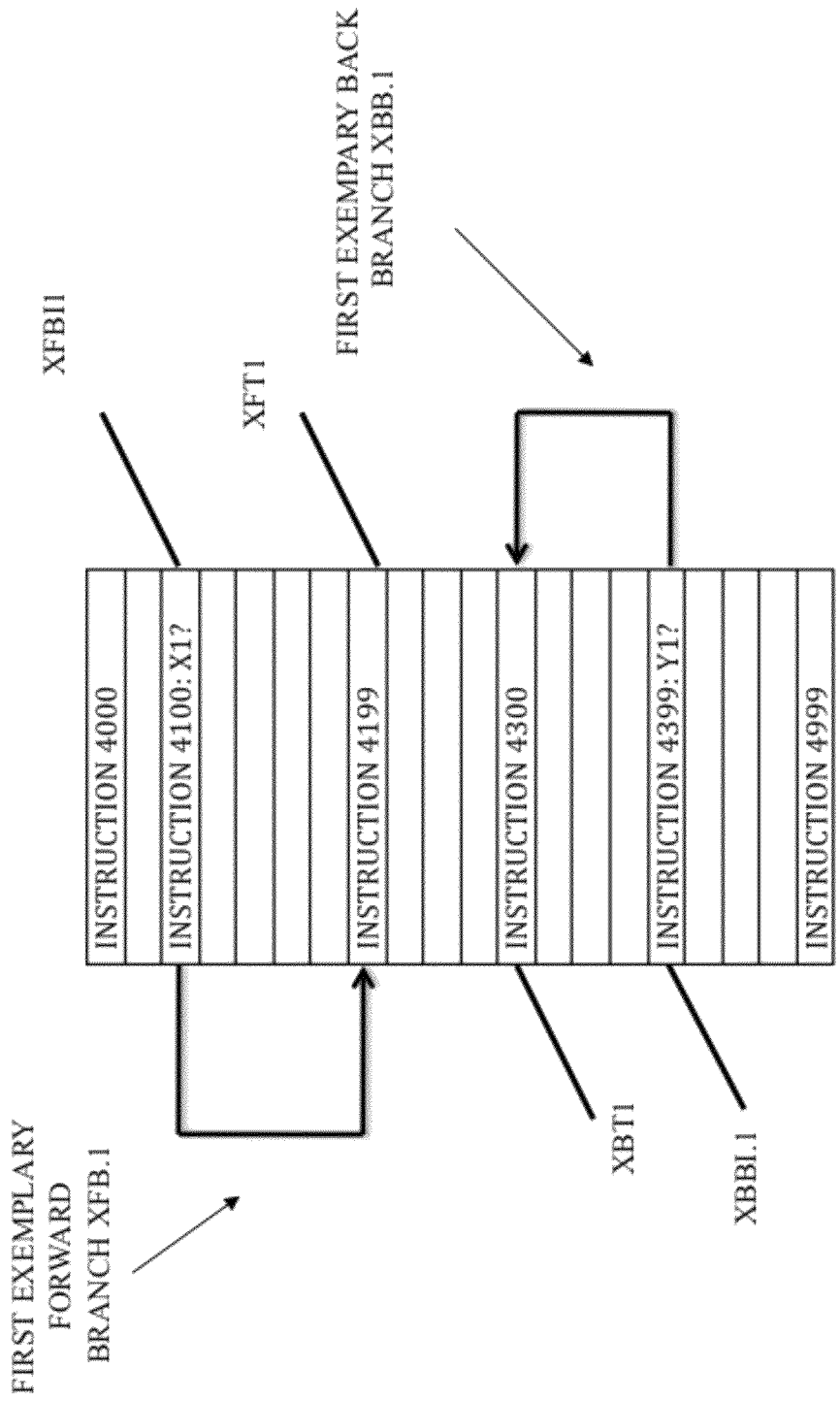
FIG. 3 is a representation of a sequential listing of software-encoded, machine-executable instructions that comprise or are provided within a selected sequence of a source software program or a resultant program as disclosed within.

FIG. 3 is a representation of a representative sequential listing of software-encoded, machine-executable instructions 4000-4999 SEQ that are analogous to the software objects O.1-O.N as comprised within the third ordered list L.3. It is understood that the third ordered list L.3 comprises a sequential list of associated and ordered software objects O.1-O.N as generated, modified and associated by steps 1.00 through 1.06 of FIG. 1A and the processes of FIGS. 1B through 1E.

The process of deriving the fourth ordered list L.4 of step 1.08 is now described by analogy, whereby a description of the modification of the logic of the instruction sequence 4000-4999 to generate equivalent encoded logic that does not cause overlapping branching in execution by the computer 2 and/or the target circuit T is described.

The executable instructions 4000-4999 SEQ are ordered for an intended order of sequential execution starting at a first instruction 4000 and proceeding through the execution of intervening instructions 4001 through 4998 until the execution of a last instruction 4999, wherein branch operations can cause the processor module 2A or target circuit T to not execute certain instructions 4000-4999 SEQ and/or to repeatedly execute certain instructions 4000-4999 SEQ.

It is understood that the term "descending order" is defined herein to denote executing, instantiating, analyzing, processing or examining the instructions 4000-4999 SEQ in sequential order starting at the first instruction 4000 and proceeding to the last instruction 4999.

It is also understood that the term "ascending order" is defined herein to denote executing, instantiating, analyzing, processing or examining the instructions 4000-4999 SEQ in sequential order opposite form the intended order of execution starting at the last instruction 4999 and proceeding to the first instruction 4000.

It is further understood that exemplary first forward branch XFB.1 and exemplary first back branch XBB.1 can be applied by the computer 2 to direct the processor module 2A to alternately (a.) skip over and not execute certain instructions; or (b.) to repeat an execution of certain instructions. For example, a first exemplary forward branch conditional logical query XFBI1 of the instruction 4100 directs the processor module 2A to proceed from executing step 4100 to step 4199 when a logical condition or value of X1 is determined to exist at the instant execution of step 4100. Logical instructions 4101 to 4199 are thus not executed by the computer 2 when the processor module 2A finds in an execution of instruction 4100 that a logical condition X1 exists, but rather the computer 2 proceeds to execute instruction 4199, i.e., forward target label 4199, as a next executed instruction after the instant execution of step 4100.

The term "forward branch instruction" is defined herein to denote a software encoded conditional logical query or test wherein a determination by the executing computer 2 or 4 of a condition or value directs the computer 2 or the reconfigurable computer 4 to proceed from the instant instruction to a forward target label, e.g., instruction 4199, without executing all instructions of comprising the source program SW.3 or resultant code R.1-R.N & SEQ.R intervening between the instant exemplary forward branch instruction XFBI1 and an associated exemplary forward target label XFT1.

It is further understood that a back branch conditional logical query or test of the first exemplary back branch instruction XBBI1 located within instruction 4399 directs the processor module 2A to proceed from executing back branch instruction 4399 to executing an instruction 4300 associated with an exemplary back target label XBT1 when the processor module 2A finds in an execution of instruction 4399 that a pre-specified logical condition exists. According to the exemplary first back branch instruction XBBI1, the processor module 2A proceeds from instruction 4399 to execute instruction 4300 when a logical condition Y1 is met in the execution of instruction 4399 that is associated with the first back branch instruction XBBI1.

The term "back branch instruction" is defined herein to denote a software encoded conditional logical query or test wherein a determination of a condition or value directs the computer 2 or the reconfigurable computer 4 to proceed from processing the instant back branch instruction, e.g., instruction 4399, to next executing a back target label XBT1, e.g., the back target label XBT1 associated with instruction 4300.

It is still further understood that one or more conditional logical queries or tests X1-XN or Y1-YN may be a negative query or test, wherein a determination of a nonexistence of a specified logical condition or value at the time of execution of the instant branch instruction FB.1-FB.N or BB.1-BB.N will lead to a positive finding of the query or test and thereby result in an activation of an associated back branch BB.1-BB.N or a forward branch FB.1-FB.N.

The term "back branch instruction" is defined herein to denote a conditional logical query or test wherein a positive finding directs the computer 2 or the reconfigurable computer 4 to proceed from an instant back branch instruction, e.g., instruction 4399, to a back target label, e.g., instruction 4300, wherein the back target label is located previous to the instant back branch instruction in the instruction sequence of instructions 4000-4999 SEQ.

It is understood that the terms "target" and "target label" as used herein indicate software code 4199 & 4300 within the instruction sequence 4000-4999 SEQ to which a computer 2 or 4 next references or executes after the execution of a branch instruction 4100 & 4399 as determined by the host computer 2 or 4.

Figure 4:
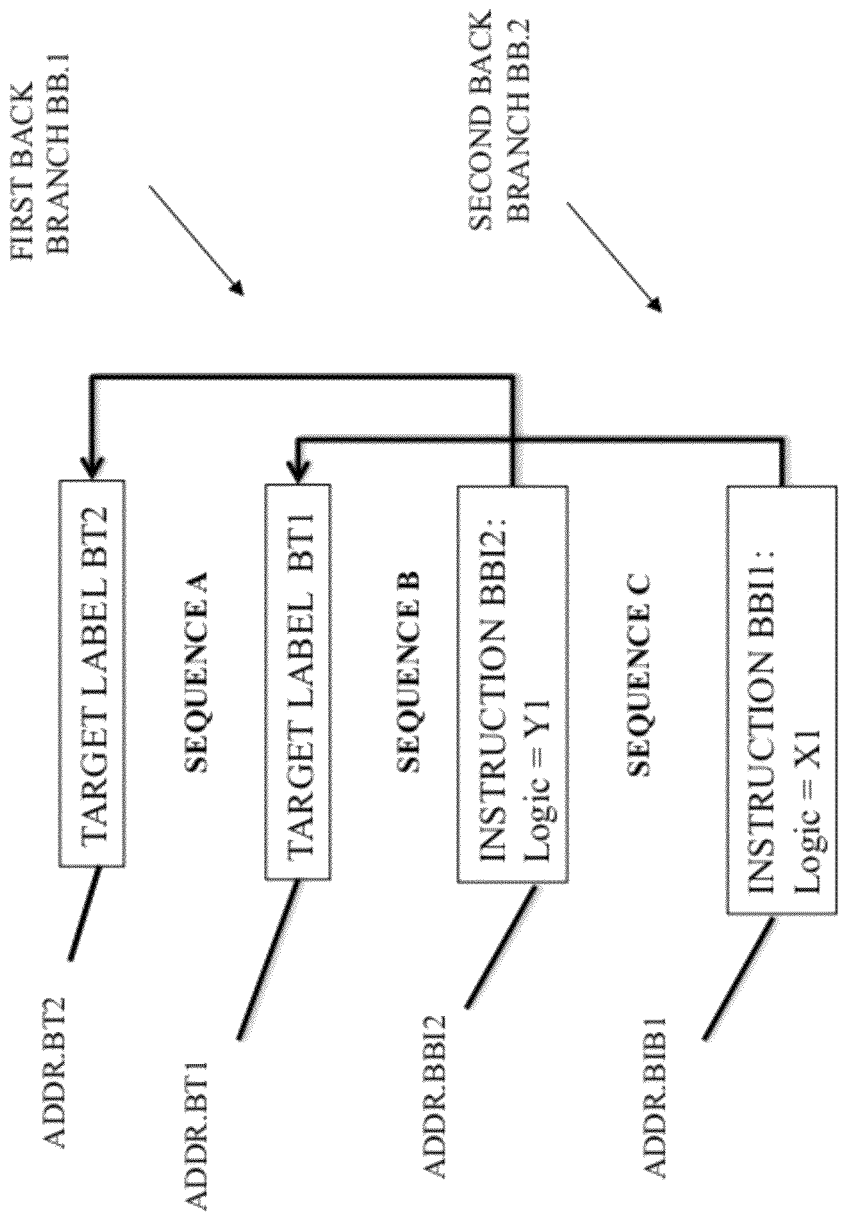
FIG. 4 presents a detail view of the sequential listing of FIG. 3 that includes an exemplary back overlap pattern that defines two overlapping conditional back branches.

FIG. 4 presents a detail view of a first portion of the sequential listing of instructions 4000-4999 SEQ that includes a back overlapping pattern that defines two overlapping back branches BB.1 & BB.2. A sequence A of instructions of the source program SW.3 is disposed between a second back target label BT2 and a first back target label BT1.

A sequence B of instructions of the source program SW.3 is disposed between the first back target label BT1 and a second back branch instruction BBI2. A sequence C of instructions of the source program SW.3 is disposed between the second branch instruction BBI2 and a first back branch instruction BBI1. The three sequence of instructions A, B & C of FIG. 4 are placed in a descending order from Sequence A to Sequence C within the source program instructions 4000-4999 SEQ.

According to the logic of the first back branch BB.1, a program execution of the source program SW.3 by the processor module 2A proceeds from the first back branch instruction BBI1 to the first back target label BT1 when a logic condition of X1 is met In the execution of the first back branch instruction BBI1.

In addition, according to the logic of the second back branch BB.2 a program execution of the source program SW.3 by the processor module 2A proceeds from the second back branch instruction BBI2 to the second back target label BT2 when a logic condition of Y1 is met in the execution of the second back branch instruction BBI2.

Figure 5A:
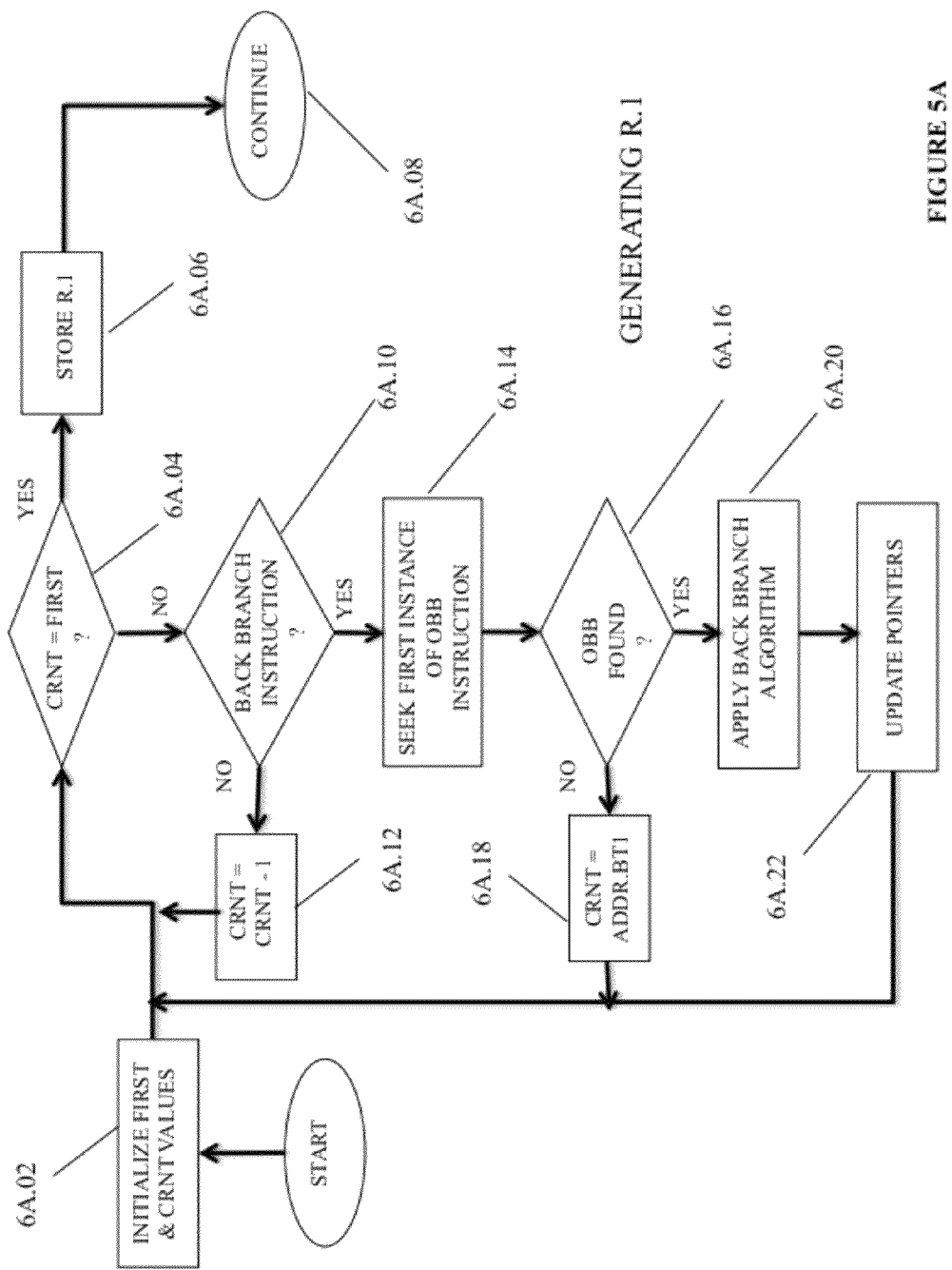
FIG. 5A is a flow chart of an application of the first aspect of the invented method wherein overlapping back branches are sequentially removed in an ascending order within the selected sequence of instructions of FIG. 3, and each back overlap pattern of is replaced with a back set generated therefrom.

FIG. 5A is a flow chart of a portion of the instruction sequence 4000-4999 SEQ that in the generation of a first resultant code R.1 replaces the back overlap pattern of FIG. 4 with a back set of FIG. 6C and thereby remove the overlapping back branches from the sequence of instructions 4000-4999 SEQ from the first resultant code R.1. A current line value CRNT and a first line value FIRST are initialized in step 6A.02 wherein the current line value CRNT is equal to the value of the final line of code 4999 of the sequence of instructions 4000-4999 SEQ and the first line value FIRST is set equal to the first line of code 4000 of the sequence of instructions 4000-4999 SEQ. In step 6A.04 the computer 2 determines if the current line value CRNT has been decremented by cycling through the loop of steps 6A.10 through 6A.22 to be made equal to or less than the first line value FIRST of 4000. When the computer 2 determines in step 6A.04 that the current line value CRNT has been decremented to be equal to or lesser than the first line value FIRST, the computer 2 proceeds on to store the software code modified by execution of steps 6A.04 through 6A.22 as a first resultant code R.1, and proceeds from step 6A.06 to step 6A.08 and to perform alternate computational operations.

When the computer 2 determines in step 6A.04 that the code line value CRNT of the sequence of instructions 4000-4999 SEQ is greater than the first line value FIRST, the computer 2 proceeds on to step 6A.10 to determine if software code at line value CRNT provides a back branch instruction. When the computer 2 determines in step 6A.10 that the software code at line value CRNT is not a back branch instruction, the computer 2 proceeds onto step 6A.12 and to decrement the current line value CRNT. The computer 2 proceeds from step 6A.12 to an additional execution of step 6A.04. When the computer 2 determines in step 6A.10 that the software code at line value CRNT is a back branch instruction BBI1, the computer 2 proceeds onto step 6A.14 and to seek a first instance of an overlapping additional back branch instruction BBI2, or "OBB", positioned between a first back branch instruction BBI1 determined in the last instance of step 6A.10 and a first back target label BT1 as specified by the first back branch instruction BB1. When an overlapping second back branch instruction BB2 is not found by the computer 2 within the sequence of instructions SEQ between the first branch instruction BB1 and the first back target label BT1 in step 6A.16, the computer 2 proceeds onto step 6A.18 and to load a value of the code line associated with the first back target label BT1 and therefrom onto step 6A.04.

When an overlapping second back branch instruction BB2 is discovered by the computer 2 within the sequence of instructions SEQ between the first branch instruction BB1 and the first back target label BT1 in step 6A.16, the computer 2 proceeds onto step 6A.20 and to apply a back branch algorithm of the first aspect of the method of the present invention as disclosed in FIG. 6B and accompanying text. The computer 2 proceeds from step 6A.20 to step 6A.22 in the process of generating the first resultant code R.1 and to update all pointers and references within the source program SW.3 that have been altered by the modifications of the instruction sequence 4000-4999 SEQ in the most recent instance of step 6A.20.

Figure 5B:
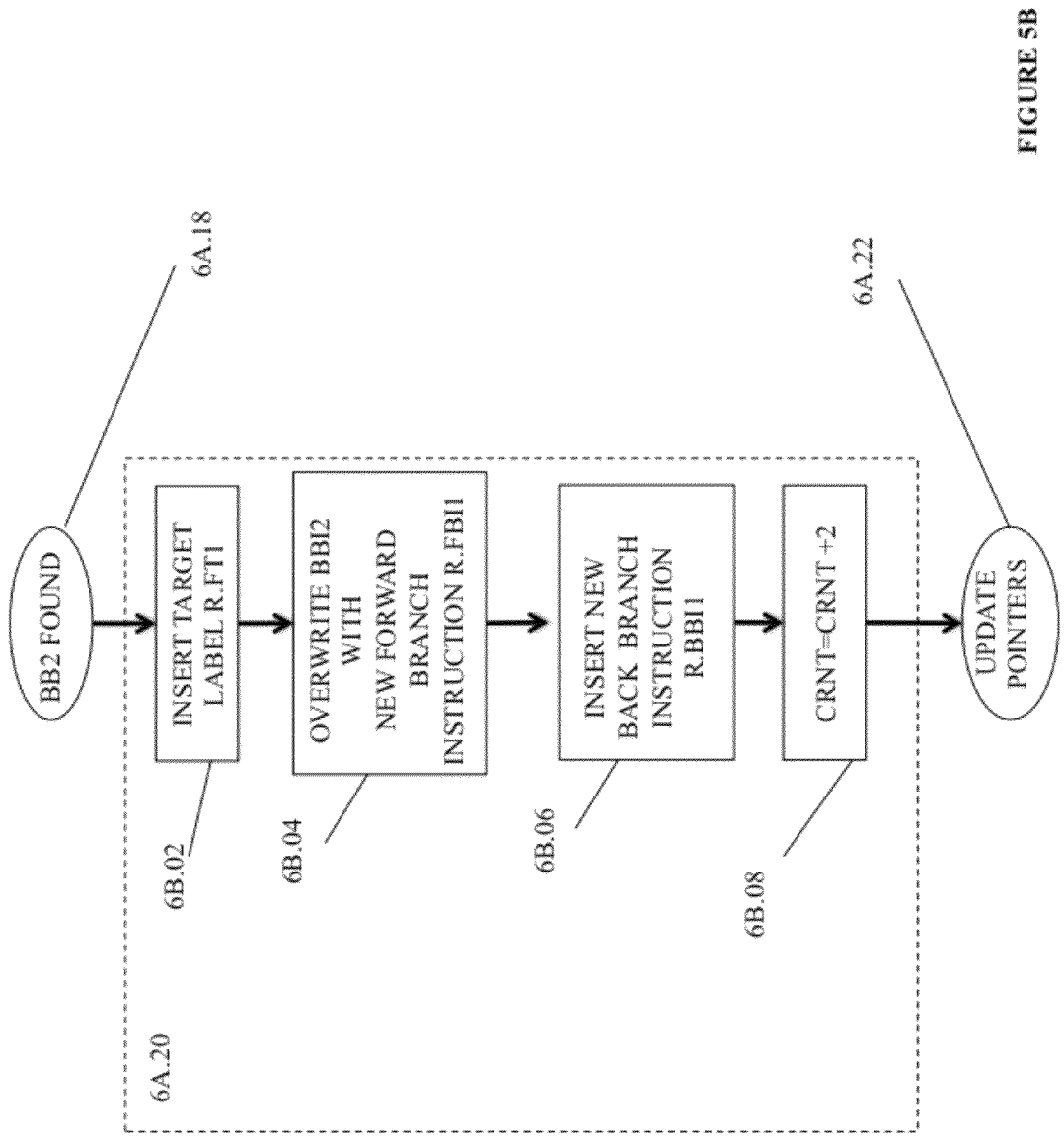
FIG. 5B is a flow chart of a derivation of an exemplary back set from the exemplary back overlap pattern of FIG. 5A and an imposition of the exemplary back set into the selected sequence of FIG. 3 in the application of the method of FIG. 5A.

FIG. 5B is a flow chart of an exemplary instance of step 6A.20 of an instantiation of the back branch algorithm of the first aspect of the invented method, wherein a pair of overlapping back branches BB.1 &BB.2 are replaced with a back set that comprises logically equivalent resultant code, wherein the equivalent first resultant code R.1 includes a first resultant first forward branch R.FB.1 and a first resultant back branch R.BB.1 and the second back branch is removed from resultant code. In step 6B.02 a new first resultant forward target label R.FT1 is inserted in the instruction sequence 4000-4999 SEQ immediately after the first back branch instruction BBI1. In step 6B.04 the second back branch instruction BBI2 is overwritten with a new first resultant forward branch instruction R.FBI1, wherein the new first resultant forward branch instruction R.FBI1 specifies that when a logical condition of Y1 is met that execution of the resultant code R.1 by the computer 2 or the reconfigurable computer 4 proceeds from first resultant forward branch instruction R.FBI1 to the first resultant forward target label R.FT1 of the first resultant code R.1. In step 6B.06 a new first resultant back branch instruction R.BBI1 is inserted into the resultant code R.1, wherein the new first resultant back branch instruction R.BBI1 specifies that when the logical condition of Y1 is met that execution of the resultant code R.1 by the computer 2 or the reconfigurable computer 4 proceeds from first resultant back branch instruction R.BBI1 to the original second back target label BT2. The current value CRNT is incremented by a value of two in step 6B.08 in recognition that the length of the resultant code of FIG. 5C contains two more instructions than the original code of FIG. 6A.

Figure 5C:
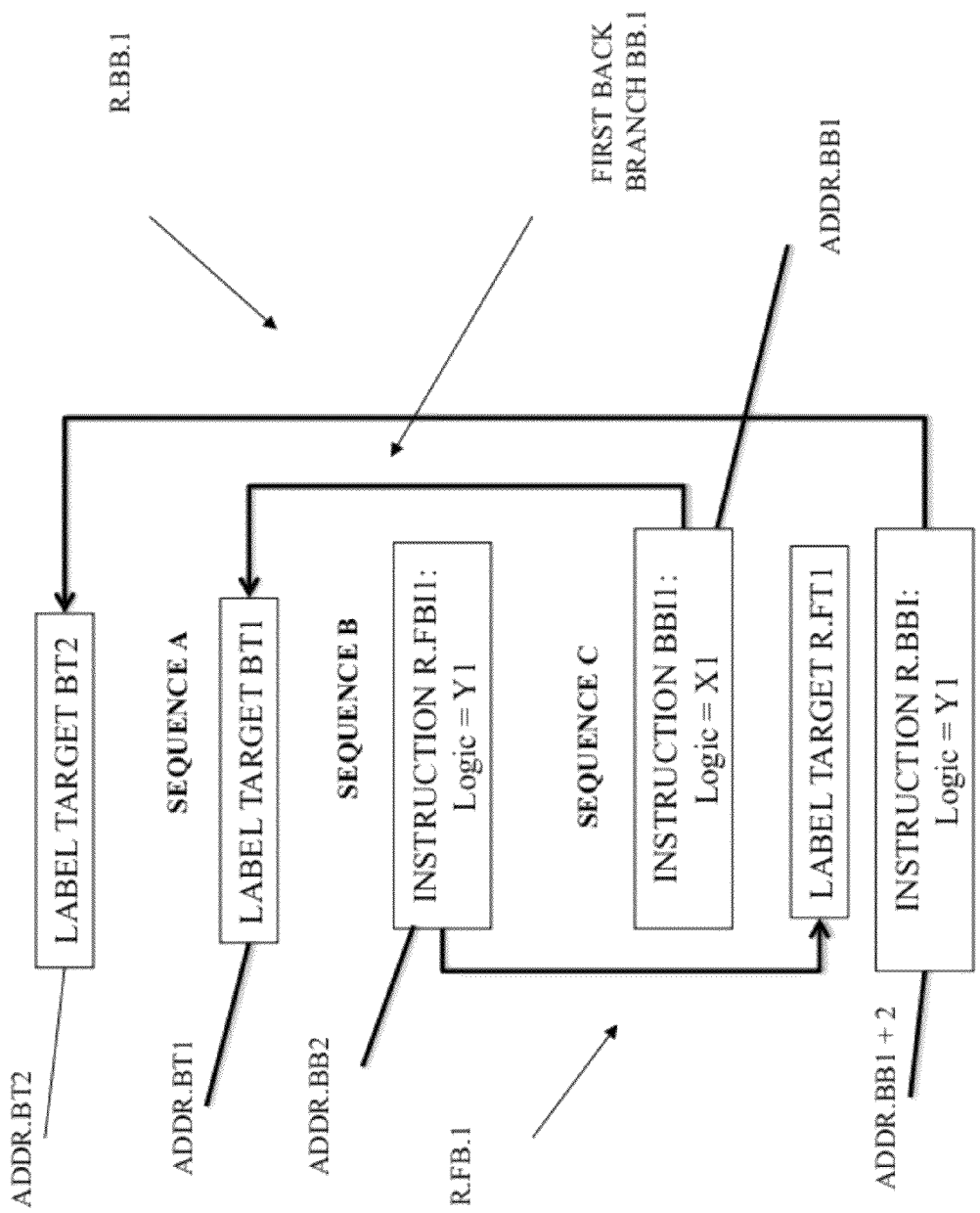
FIG. 5C is a representation of a detail of a first resultant software code that includes a back set of instructions derived from the exemplary back overlap pattern of FIG. 4 and in accordance with the first aspect of the invented method of FIGS. 5A and 5B.

FIG. 5C is an illustration of an element of a back set of a first resultant code R.1 that is derived from the first code portion of FIG. 4 in accordance with the first aspect of the invented method and in an implementation of the method of FIG. 6B, wherein the system software SW.2 or SW.5 modifies the source program SW.3 to generate the first resultant code R.1 by reformulating the second back branch BB.2 as a first resultant forward branch R.FB.1 and a first resultant back branch R.BB.1.

According to the first resultant forward branch R.FB.1, a program execution of the resultant code R.1 by the processor module 2A proceeds from a resultant forward branch instruction R.FB1 of the first resultant forward branch R.FB.1 to the second branch target label BT2 when a logic condition of Y1 is met in the execution of the resultant forward branch instruction R.FBI1.

According to the first resultant back branch R.BB.1 a program execution of the resultant code R.1 by the processor module 2A proceeds from a resultant third back branch instruction R.BBI3 to a resultant back target label R.BT3 when a logic condition of Y1 is met in the execution of the resultant third back branch instruction R.BBI3.

The first resultant code R.1 is organized as follows: (1.) sequence A of the source program SW.3 is disposed between the resultant branch third target label R.BT3 and the first branch target label BT1; (2.) sequence B of the source program SW.3 is disposed between the first branch target label BT1 and the resultant first forward branch instruction R.FBI1; (3.) sequence C of the source program SW.3 is disposed between the resultant first forward branch instruction R.FBI1 and the back branch instruction BBI1; (4.) and the resultant first branch target label R.FT1 is disposed between the back branch instruction BBI1 and the third resultant back branch instruction R.BB3.

Figure 6:
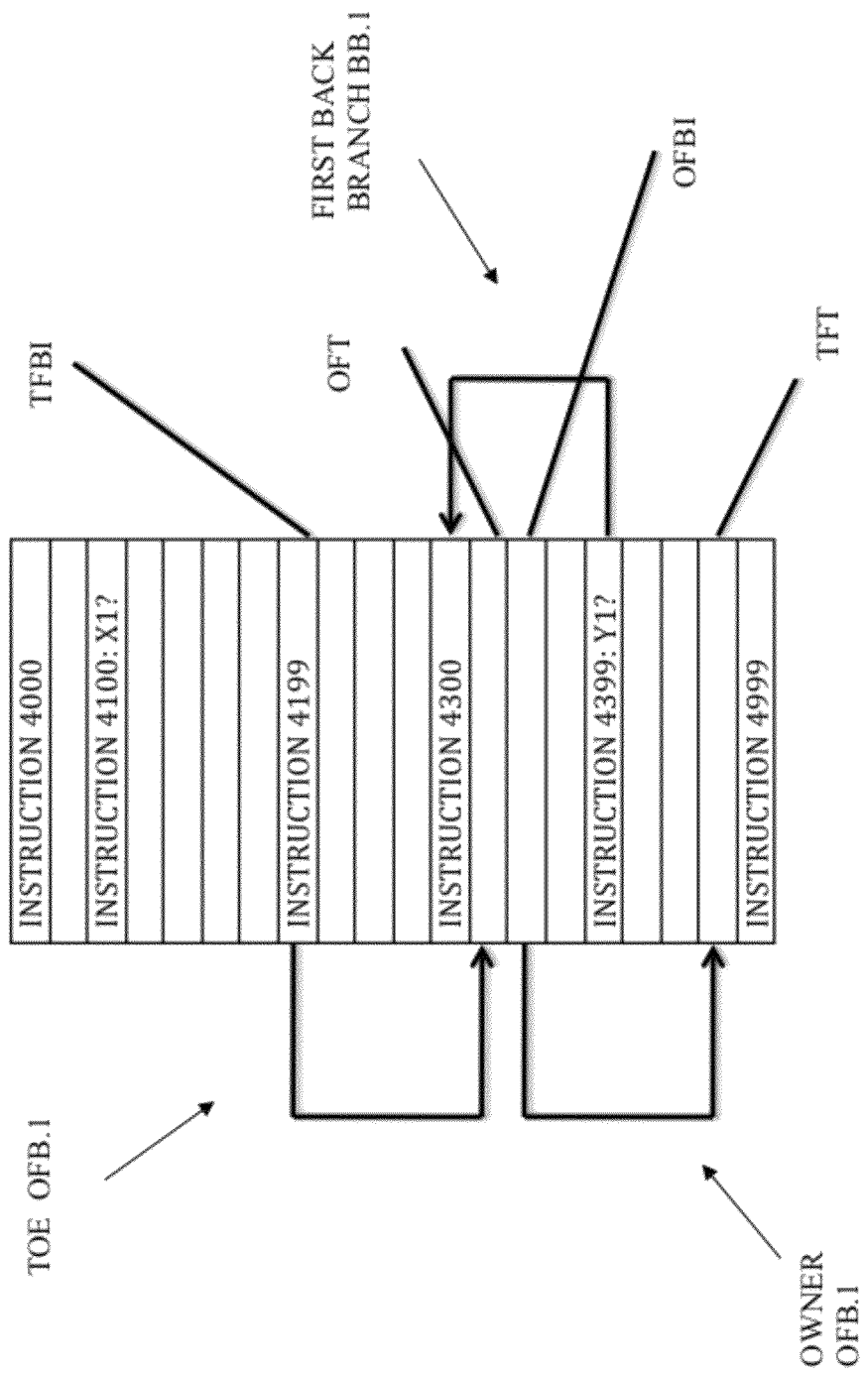
FIG. 6 presents a detail view of a second portion of the selected sequence of instructions of FIG. 3 that an owner pattern of overlapping conditional branches and a toe pattern of overlapping conditional branches.

FIG. 6 presents a detail view of the instruction sequence 4000-4999 SEQ that includes the first back branch BB.1 and two exemplary overlapping forward branches OFB.1 & OFB.2. The second optional aspect of the invented method is applied to provide a second resultant code R.2 that removes forward branch overlapping of each back branch of the first resultant code R.1 in that generation of a second resultant code R.2, wherein the second resultant code R.2 includes an equivalent logical flow of the instruction sequence 4000-4999 SEQ of the instruction sequence 4000-4999.

For the purpose of explanation of the second aspect of the invented method, FIG. 6 presents an exemplary toe overlapping forward branch TFB.1 and an exemplary owner overlapping forward branch OFB.1.

The exemplary first toe overlapping forward branch TOFB.1 is generated by a toe forward branch instruction TFBI that both (a.) is positioned earlier in the instruction sequence 4000-4999 SEQ than the target label BT1 of the first back branch instruction BBI1; and (b.) points to a toe forward branch target TFT that is positioned between the first back branch instruction BBI1 and the first back branch target BT1.

The exemplary owner overlapping forward branch OFB.1 is generated by an owner forward branch instruction OFBI that (a.) is positioned in the instruction sequence 4000-4999 SEQ between the first target label BT1 and the first back branch instruction BBI1; and (b.) is directed to an owner forward target label OFT that is positioned within the instruction sequence 4000-4999 SEQ after the first back branch instruction BBI1.

Figure 7:
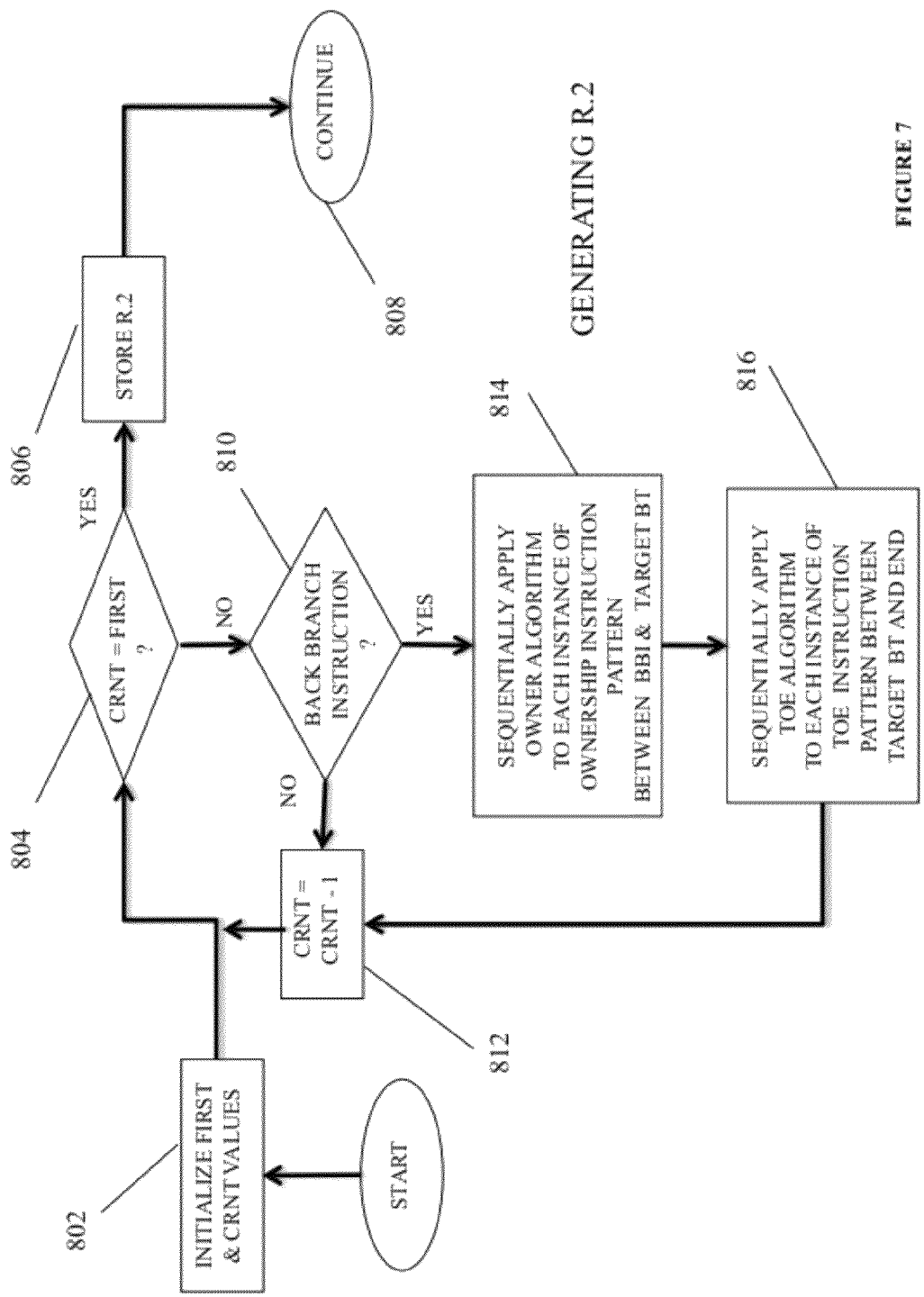
FIG. 7 is a flow chart of an application of the second aspect of the invented method wherein overlapping owner patterns and toe patterns an are sequentially removed in an ascending order within the first resultant code of FIG. 1F and each overlapping owner pattern and toe pattern is respectively is respectively replaced with an equivalent owner set or toe set.

FIG. 7 is a flow chart of a second portion of the first system software SW.2 that implements the second optional aspect of the invented method and removes mutual overlapping of back branches and forward branches from the sequence of instructions 4000-4999 SEQ.

The current line value CRNT and the first line value FIRST are initialized in step 802 wherein the current line value CRNT is set to be equal to the value of the final line of code 4999 of the sequence of instructions 4000-4999 SEQ and the first line value FIRST is set to be equal to the first line of code 4000 of the sequence of instructions 4000-4999 SEQ. In step 804 the computer 2 determines if the current line value CRNT has been decremented by cycling through the loop of steps 810 through 816 to be made equal to or less than the first line value FIRST of 4000. When the computer 2 determines in step 804 that the current line value CRNT has been decremented to be equal to or lesser than the first line value FIRST, the computer 2 proceeds on to store the software code modified by execution of steps 810 through 816 as the second resultant code R.2, and proceeds from step 806 to step 808 and to perform alternate computational operations.

When the computer 2 determines in step 804 that the code line value CRNT of the sequence of instructions 4000-4999 SEQ is greater than the first line value FIRST, the computer 2 proceeds on to 810 to determine if software code at line value CRNT provides a back branch instruction. When the computer 2 determines in step 810 that the software code at line value CRNT is not a back branch instruction, the computer 2 proceeds onto step 812 and to decrement the current line value CRNT. The computer 2 proceeds from step 812 to an additional execution of step 804.

When the computer 2 determines in step 810 that the software code at line value CRNT is an exemplary third back branch instruction BBI3, the computer 2 proceeds onto step 814 to (a.) detect each instance on an overlapping internal forward branch instruction OFB positioned between the exemplary instant third back branch instruction BBI3 and a third back target label BT3; and (b.) apply an owner algorithm to each detected instance of forward branches that overlap the instant third branch BB.3 to generate the second resultant code R.2, wherein the overlapping instructions of the first resultant code R.1 is replaced in the second resultant code R.2 with one or more owner sets that thereby reduce or avoid the generation of internal forward branches overlapping the instant third back branch BB.3.

After the removal of internal forward branches that overlap the instant exemplary third back branch BB.3, the computer 2 proceeds on to step 816 to remove each instance of overlapping external forward branches of the first resultant code R.1 in the generation of the second resultant code R.2. In step 816, the computer 2 proceeds to (a.) detect each instance on an overlapping external forward branch instruction OFB positioned between the exemplary instant third back target label BT3 and the first instruction 4000 of the instruction sequence 4000-4999 SEQ; and (b.) apply a toe algorithm to each instance of forward branches detected in step 816 that overlap the instant third branch BB.3 to generate the second resultant code R.2, wherein the overlapping instructions of the first resultant code R.1 are replaced in the second resultant code R.2 with one or more toe sets that thereby reduce or avoid the generation of external forward branches overlapping the instant third back branch BB.3.

The computer 2 proceeds from step 816 to step 812 and to decrement the current value CRNT, and therefrom to another execution of step 804.

Figure 8B:
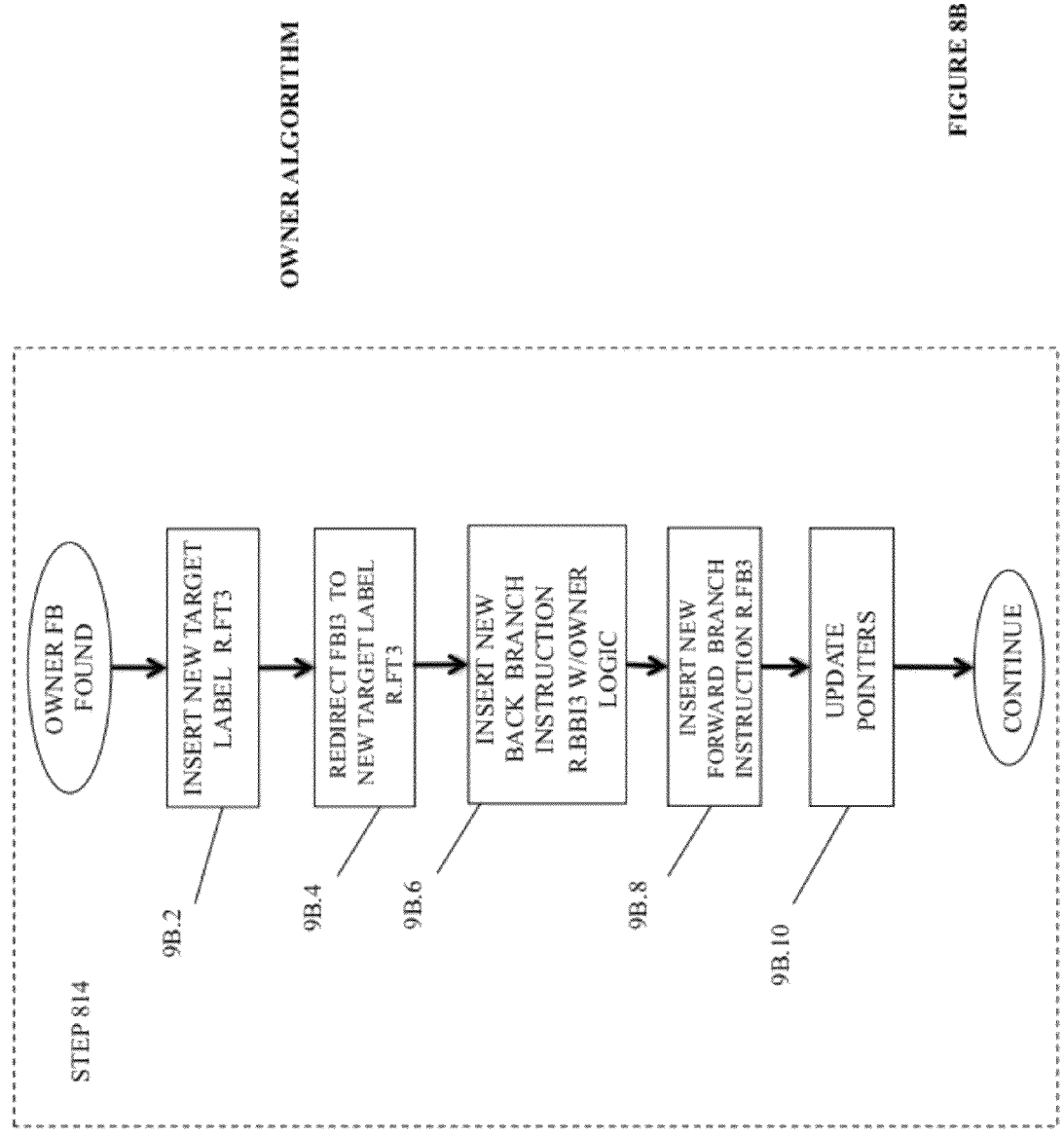
FIG. 8B is a flow chart of a derivation and imposition of an owner set into the software code of FIG. 8A.
Figure 8C:
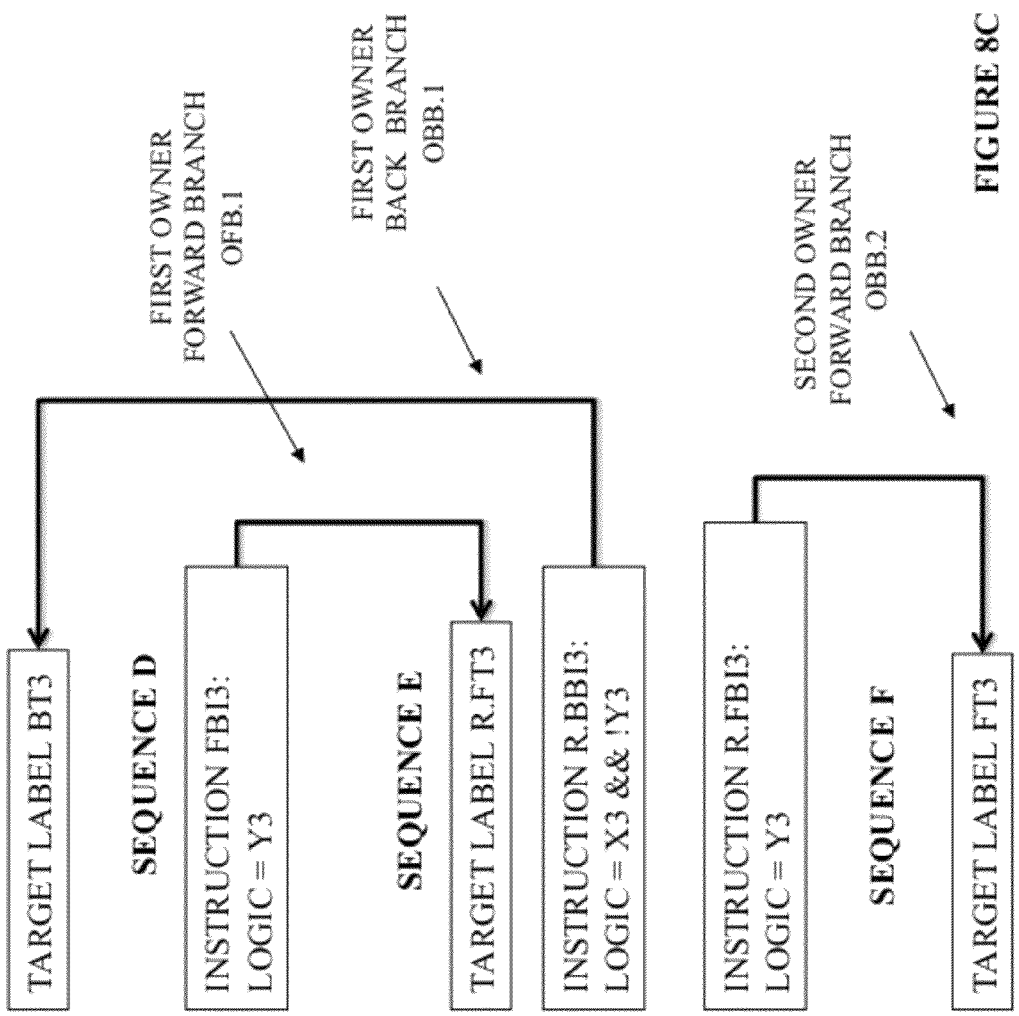
FIG. 8C is a representation of the owner set generated by the method of FIG. 8B as written into the second resultant software of FIG. 1F.
Figure 9B:
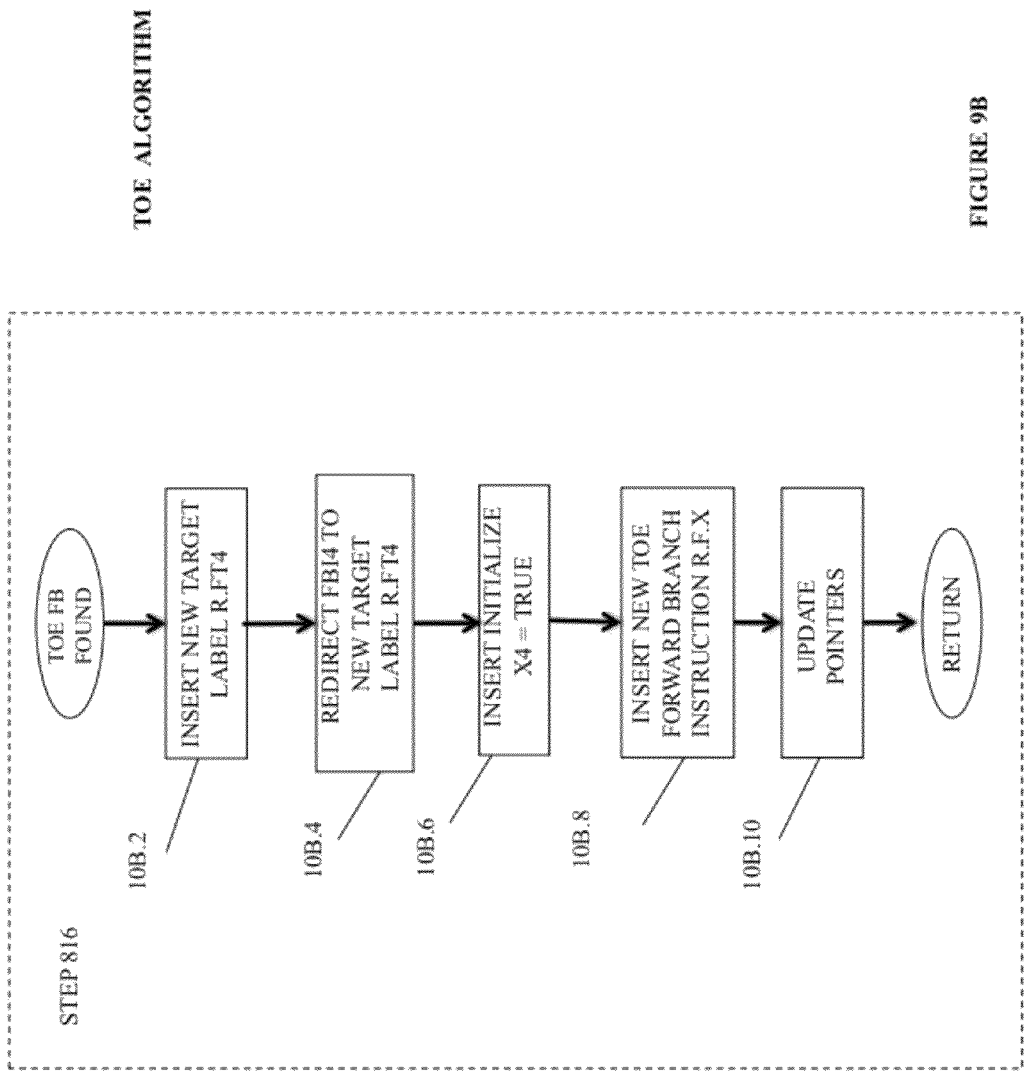
FIG. 9B is a flow chart of a derivation and imposition of a toe set into the software code of FIG. 9A.

Referring generally to Figures and particularly to FIGS. 7, 8A, 8B, 8C, 9A, 9B and 9C, it is understood that the generation of owner sets as illustrated in FIGS. 8A, 8B and 8C may occur repeatedly in succeeding modifications of the first resultant code R.1, or alternatively of source code SW.3, in the execution of step 814. It is understood that the generation of toe sets as illustrated in FIGS. 9A, 9B and 9C may occur repeatedly in succeeding modifications of the first resultant code R.1, or alternatively of source code SW.3, in the execution of step 816.

FIGS. 8A through 8C illustrate the partial generation of the second resultant code R.2 by replacement of owner instruction patterns of the first resultant code R.1 with owner sets of the second resultant code R.2.

FIG. 8A presents a detail view of a first instruction sequence R1.SEQ1 of the resultant code R.1, or optionally the source program SW.3, that includes an owner instruction pattern and three sequences of instructions D, E & F.

The owner instruction pattern provides a third forward branch FB.3 that overlaps a third back branch BB.3, wherein the third back branch BB.3 is formed by a third back branch instruction BBI3 that points to a third back target label BT3, and the third forward branch FB.3 is formed by a third forward branch instruction FBI3 that points to a third forward target label FT3. The third forward target label FT3 is positioned at the end of the first instruction sequence R1.SEQ1.

According to the logic of the third forward branch FB.3, a program execution of the first instruction sequence R1.SEQ1 by the processor module 2A proceeds from the third forward branch instruction FBI3 to the third forward target label FT3 when a logic condition of Y3 is met In the execution of the third forward branch instruction FBI3. Furthermore, according to the logic of the third back branch BB.3, a program execution of the first instruction sequence R1.SEQ1 by the processor module 2A proceeds from the third back branch instruction BBI3 to the third back target label BT3 when a logic condition of X3 is met In the execution of the third back branch instruction BBI3.

An instruction sequence D of instructions of the first resultant code R.1 is disposed between third back target label BT3 and the third forward branch instruction FBI3. An instruction sequence E of instructions of the first resultant code R.1 is disposed between the third forward branch instruction FBI3 and the third back branch instruction BBI3. An instruction sequence F of instructions of the first resultant code R.1 is disposed between the third back branch instruction BBI3 and the third forward target label FT3. The three sequences of instructions D, E & F of FIG. 9A are placed in a descending order from Sequence D to Sequence F within the instruction sequence 4000-4999 SEQ of the first resultant code R.1.

FIG. 8B is an Illustration of an execution of the owner algorithm that is applied in step 814 as often as required in ascending order within the resultant code R.1 to replace owner overlap patterns with owner sets. Toward this end, system software SW.2 directs the computer 2 or 4 to seek all forward branch instructions that form an owner overlap pattern in combination with the instant back branch instruction, wherein each relevant forward branch (1.) is located in the first resultant code R.1 between the instant back branch instruction selected in the most previous execution of step 810 and the back target label of the instant back branch instruction; and (2.) forms an overlap pattern by having an associated forward target label that is located later in the first resultant code R.1 than the instant back branch instruction.

In step 9B.2 a new forward target label R.FT3 is inserted at the end of sequence E. In step 9B.4, the third forward branch instruction FBI3 is modified to point to the newly inserted forward target label R.FT3. In step 9B.6 a new owner back branch instruction R.BBI3 is inserted into the first instruction sequence R1.SEQ1 immediately after the new forward target label R.FT3. The owner back branch instruction R.BBI3 includes logic that directs the computer to proceed to the third back target label BT3 when the following logical statement is true:

[X3 and NOT(Y3)].

In step 9B.8 a new resultant forward branch instruction R.FBI3 is inserted into the first instruction sequence R1.SEQ1 immediately after the owner back branch instruction R.BBI3, wherein the new resultant forward branch instruction R.FBI3 directs execution of the second resultant code R.2 to proceed from the forward branch instruction R.FBI3 to the original third forward target label FT3 of the forward branch instruction FBI3 of the owner overlap pattern of FIG. 9A. Any and all pointers and references of the first resultant code R.1 are updated as necessary in step 9B.10 in view of the addition of instructions to the first resultant code R.1 imposed by the execution of steps 9B.2-9B.8.

It is understood the that owner set of FIG. 8C creates three branches owner branches OBB.1, OFB.1 & OFB.2 in the generation of the second resultant code R.2, namely a first owner forward branch OFB.1 that extends from the third forward branch instruction FBI3 to the resultant forward target label R.FT3 and is activated when the logical state of Y3 is true at the moment of execution of the third forward branch instruction FBI3; a first owner back branch OBB.1 that extends from the owner back branch instruction R.BBI3 to the third back target label BT3 and is activated when the logical equation of [X3 and NOT(Y3)] is true at the moment of execution of the owner back branch instruction R.BBI3; and a second owner forward branch OFB.2 that extends from the resultant forward branch instruction R.FBI3 to the third forward target label FT3 located at the end of the Instruction sequence I, wherein the second owner forward branch OFB.2 is activated when the logical condition Y3 is true at the moment of execution of the resultant forward branch instruction R.FBI3.

Referring now to FIGS. 9A through 9C, FIGS. 9A through 9C illustrate the partial generation of the second resultant code R.2 by replacement of toe instruction patterns of the first resultant code R.1 with toe sets of the second resultant code R.2. FIG. 9A illustrates an exemplary first toe instruction pattern positioned within a second resultant instruction sequence R1.SEQ2 of the first resultant sequence R.1. The exemplary toe instruction pattern includes a fourth forward branch instruction FBI4 placed immediately before an instruction sequence J; a fourth back target label BT4 located immediately after the instruction sequence J and immediately before an instruction sequence K; and a fourth forward target label FT4 located immediately after the instruction sequence K and immediately before an instruction sequence L.

The fourth forward branch instruction FBI4 activates a fourth forward branch FB.4, wherein an execution of the first resultant code R.1 proceeds from the fourth forward branch instruction FBI4 to the fourth forward target FT4 when a logic condition Y4 is determined to be true at the moment of execution of the fourth forward branch instruction FBI4. The fourth back branch instruction FBI4 activates a fourth back branch BB.4, wherein an execution of the first resultant code R.1 proceeds from the fourth back branch instruction BBI4 to the fourth back target BT4 when a logic condition X4 is determined to be true at the moment of execution of the fourth back branch instruction BBI4.

The owner instruction pattern provides a fourth forward branch FB.4 that overlaps a fourth back branch BB.4, wherein the fourth back branch BB.4 is formed by a fourth back branch instruction BBI4 that points to a fourth back target label BT4, and the fourth forward branch FB.4 is formed by a fourth forward branch instruction FBI4 that points to a fourth forward target label FT4. The fourth forward branch instruction FBI4 is positioned at the beginning of the first instruction sequence R1.SEQ2 and the fourth forward target label FT4 is positioned in between the third back branch target FT4 and the fourth back branch target FT4.

According to the logic of the fourth forward branch FB.4, a program execution of the second instruction sequence R1.SEQ2 by the processor module 2A proceeds from the fourth forward branch instruction FBI4 to the fourth forward target label FT4 when a logic condition of Y4 is true at the moment of execution of the fourth forward branch instruction FBI4. Furthermore, according to the logic of the fourth back branch BB.4, a program execution of the second instruction sequence R1.SEQ2 by the processor module 2A proceeds from the fourth back branch instruction BBI4 to the fourth back target label BT4 when a logic condition of X4 is true at the moment of execution of the fourth back branch instruction BBI4.

FIG. 9A further illustrates that an instruction sequence G is disposed between the fourth branch instruction FBI4 and the fourth back target label BT4; that an instruction sequence H is disposed between the fourth forward back label BT4 and the fourth forward target label FT4; and an instruction sequence I is disposed between the fourth forward target label FT4 and the fourth back target instruction BBI4.

FIG. 9B is an Illustration of an execution of the toe algorithm that is applied in step 816 as often as required in ascending order within the resultant code R.1 to replace toe overlap patterns with toe sets in the second resultant code R.2. Toward this end, system software SW.2 or SW.5 directs the computer 2 or 4 to seek all forward branch instructions that form a toe overlap pattern in combination with the instant back branch instruction, wherein each relevant toe pattern forward branch instruction (1.) is located in the first resultant code R.1 after the back target label of the instant back branch instruction; and (2.) forms a toe overlap pattern in combination with the instant back branch instruction by having an associated forward target label that is located between the instant back target label and the instant back branch instruction.

According to the software-encoded toe algorithm of FIG. 9B, when a toe instruction pattern is determined in step 8.16, a new resultant forward target label R.FT4 is inserted in step 10B.2 immediately after the end of instruction sequence G. The fourth forward branch instruction FBI4 is modified to point to the new resultant forward target label R.FT4 in step 10B.4 and thereby to form the first toe forward branch TFB.1. A new first toe set instruction TI.1 is inserted between the new resultant forward target label R.FT4 and the fourth back target label BT4, wherein the first toe set instruction TI.1 sets the condition X4 to be true.

A new resultant toe fourth branch instruction R.FBI4 is inserted in step 10B.8, wherein the resultant toe fourth branch instruction R.FBI4 includes logic that directs the computer to proceed to the fourth forward target label FT4 when the following logical statement is true:

[NOT(X4) or Y4].

Any and all pointers and references of the first resultant code R.1 are updated as necessary in step 10B.10 in view of the addition of instructions to the first resultant code R.1 imposed by the execution of steps 10B.2-10B.8.

FIG. 9C is an illustration of an exemplary application of the toe algorithm of the invented method by the software-encoded method of FIG. 10B upon the toe instruction pattern of FIG. 10A to generate the exemplary toe set of FIG. 100 of the second resultant code R.2. As presented in FIG. 100, the first toe forward branch TFB.1 of the toe set is formed by the fourth forward branch instruction FBI4 and the fourth resultant forward target R.FT4. The second toe forward branch TFB.2 of the exemplary toe set is formed by the resultant toe fourth branch instruction R.FBI4 and the fourth forward target label FT4.

Figure 10:
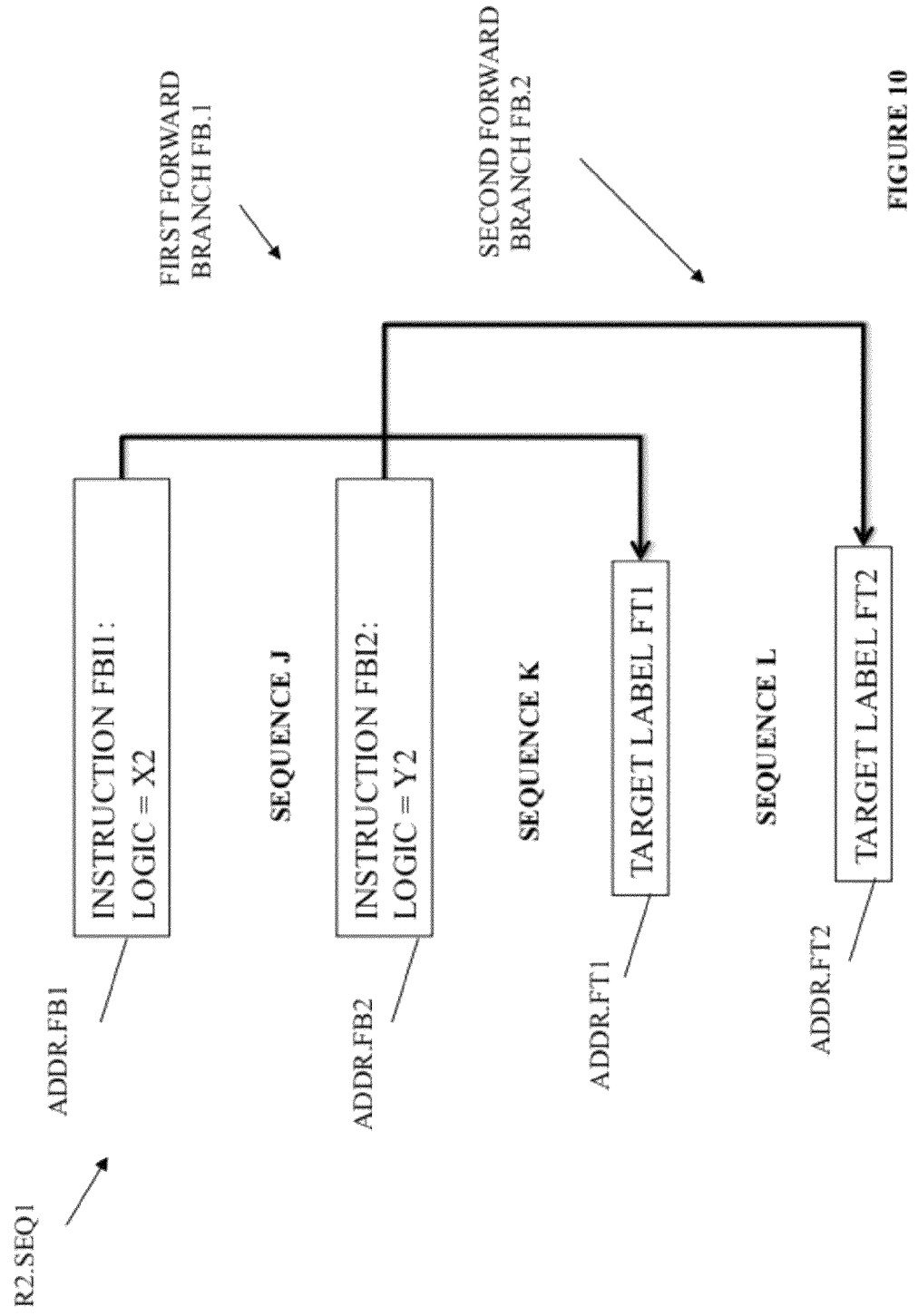
FIG. 10 presents a detail view of the sequential listing of FIG. 3, the first resultant code of FIG. 1F and/or the second resultant code of FIG. 1F that includes an exemplary forward overlap pattern that defines two overlapping conditional forward branches.

FIG. 10 is an illustration of a first sequence of software code R2.SEQ1 of the second resultant code R.2 that provides an overlapping pair of forward branches FB.1 & FB.2. The first sequence of software code R2.SEQ1 includes a forward overlap pattern composed of a first forward branch instruction FBI1 and a second forward branch instruction FBI2, wherein the first forward branch instruction FBI1 points to a first forward target label FT1 that is located between the second forward branch instruction FBI2 and a second forward target label FT2 to which the second forward branch instruction FBI2 points. The first forward branch instruction FBI1 is located immediately before an instruction sequence J and the second forward branch instruction FBI2 is located immediately after the instruction sequence J. A sequence K of code is disposed immediately after the second forward branch instruction FBI2 and immediately before the first target label FT1. An instruction sequence L is disposed immediately between the first target label FT1 and the second target label FT2.

Figure 11A:
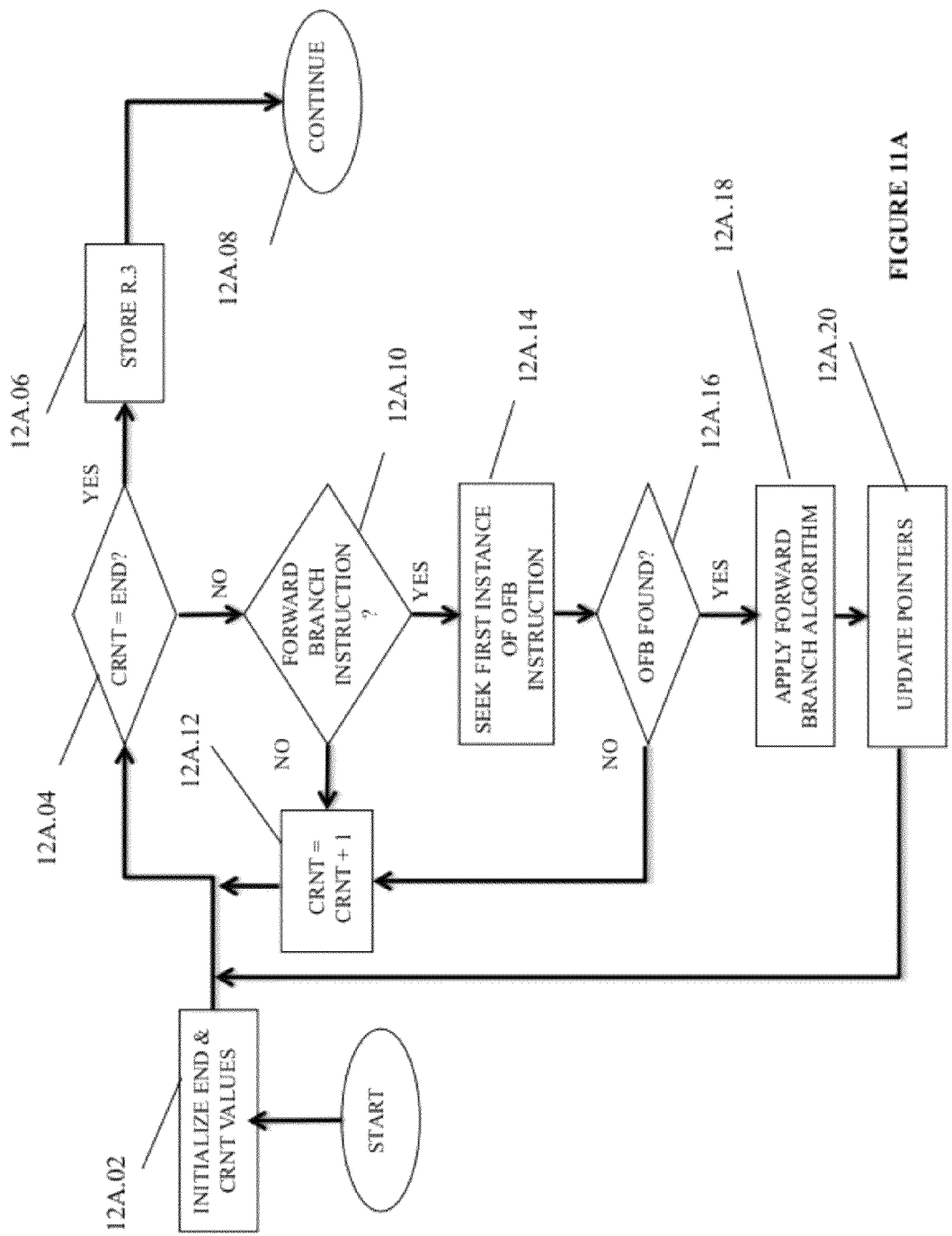
FIG. 11A is a flow chart of an application of the third aspect of the invented method wherein overlapping forward branches are sequentially removed in a descending order within the source program, the first resultant code and/or the second resultant code of FIG. 1F, and whereby each forward overlap pattern is replaced with a forward set derived therefrom.

FIG. 11A is a flow chart of a portion of the first system software SW.2 and the second system software SW.5 that in the generation of a third resultant code R.3 replaces the forward overlap patterns of FIG. 11 with a forward set of FIG. 12C and thereby remove the overlapping forward branches from the sequence of instructions 4000-4999 SEQ from the second resultant code R.2. A current line value CRNT and a last line value END are initialized in step 12A.02 wherein the current line value CRNT is equal to the value of the first line of code 4000 of the sequence of instructions 4000-4999 SEQ and the last line value END is set equal to the last line of code 4999 of the sequence of instructions 4000-4999 SEQ. In step 12A.04 the computer 2 determines if the current line value CRNT has been incremented by cycling through the loop of steps 12A.10 through 12A.22 to be made equal to or greater than the last line value END of 4999. When the computer 2 determines in step 12A.04 that the current line value CRNT has been incremented to be equal to or greater than the last line value END, the computer 2 proceeds on to store the software code modified by execution of steps 12A.04 through 12A.22 as a third resultant code R.3, and proceeds from step 12A.06 to step 12A.08 and to perform alternate computational operations.

When the computer 2 determines in step 12A.04 that the code line value CRNT of the sequence of instructions 4000-4999 SEQ is less than the last line value END, the computer 2 proceeds on to step 12A.10 to determine if software code at line value CRNT provides a forward branch instruction. When the computer 2 determines in step 12A.10 that the software code at line value CRNT is not a forward branch instruction, the computer 2 proceeds onto step 12A.12 and to increment the current line value CRNT. The computer 2 proceeds from step 12A.12 to an additional execution of step 12A.04.

Alternately, when the computer 2 determines in step 12A.10 that the software code at line value CRNT is a forward branch instruction, the computer 2 proceeds onto step 12A.14 and to seek a first instance of an overlapping additional forward branch instruction FBI2, or "OBB", positioned between a forward branch instruction FBI1 determined in the last instance of step 12A.10 and a first forward target label FT1 as specified by the first forward branch instruction FBI1. When an overlapping second forward branch instruction FBI22 is not found by the computer 2 within the sequence of instructions found between the first forward branch instruction FBI1 and the first forward target label FT1 in step 12A.16, the computer 2 proceeds onto step 12A.12 and therefrom onto step 12A.04.

When an overlapping forward branch instruction FBI2 is found in step 12A.16, the forward algorithm is applied in step 12A.18 as illustrated in FIG. 12B. The computer 2 or 4 proceeds from step 12A.18 to step 12A.20 in the process of generating the third resultant code R.3 and to update all pointers and references within the source program SW.3 that have been altered by the modifications of the instruction sequence 4000-4999 SEQ in the most recent instance of step 12A.18.

Figure 11B:
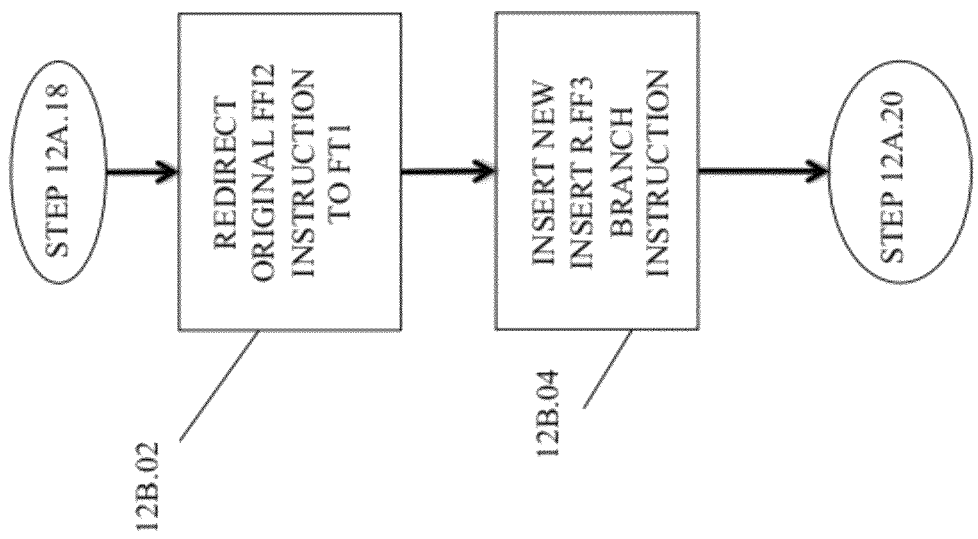
FIG. 11B is a flow chart of a derivation and imposition of an exemplary forward set into the software code of FIG. 10 in the application of the method of FIG. 11A.

FIG. 11B is a flow chart of a software-encoded application of the third optional aspect of the invented method that removes a forward instruction pattern from a second resultant R.2 software and replaces the forward instruction pattern with a logically equivalent forward set in the third resultant code R.3. In step 12B.02 the second forward branch instruction FBI2 is modified to point to the first forward target label FT1 to which the first forward branch instruction FBI1 also points.

In step 12B.04 the a new third resultant forward branch instruction R.FBI3 is inserted between the first forward target label FT1 and the sequence L, wherein the third resultant forward branch instruction R.FBI3 directs the computer 2 or 4 to proceed directly on to the first forward target label FT1 when the logic condition of Y2 is TRUE.

Figure 11C:
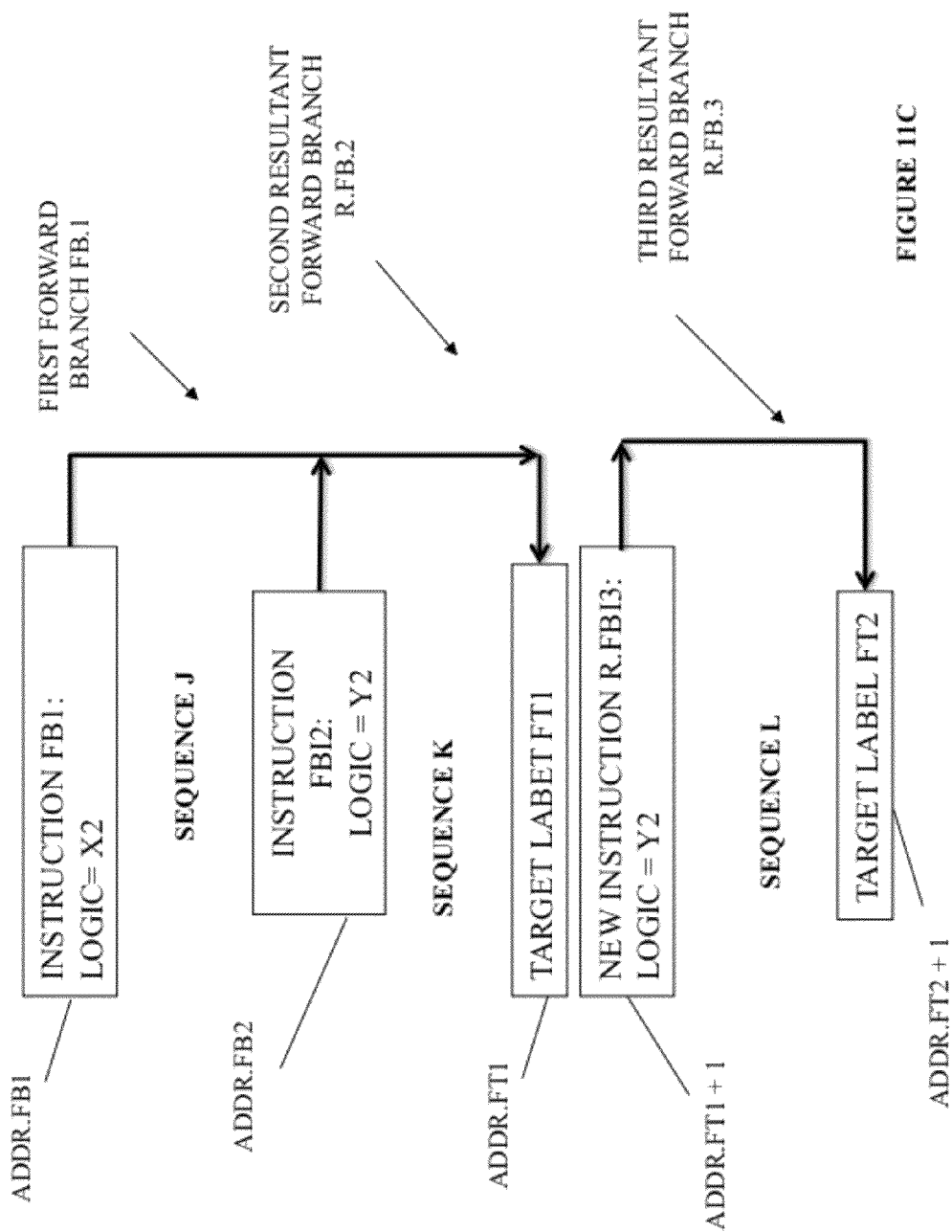
FIG. 11C is a representation of a detail of a third resultant software code that includes a back set of instructions derived from the exemplary back overlap pattern of FIG. 11A and in accordance with the second aspect of the invented method of FIGS. 11A and 11B.

FIG. 11C is an illustration of the forward set as generated by the method of FIG. 2B as an element of the third resultant code R.3, wherein the first forward branch FB.1 of the forward instruction pattern, a second resultant branch R.FB.2 and a third resultant forward branch R.FB.3 provide logic equivalent to the originating forward instruction pattern of FIG. 11.

Figure 12:
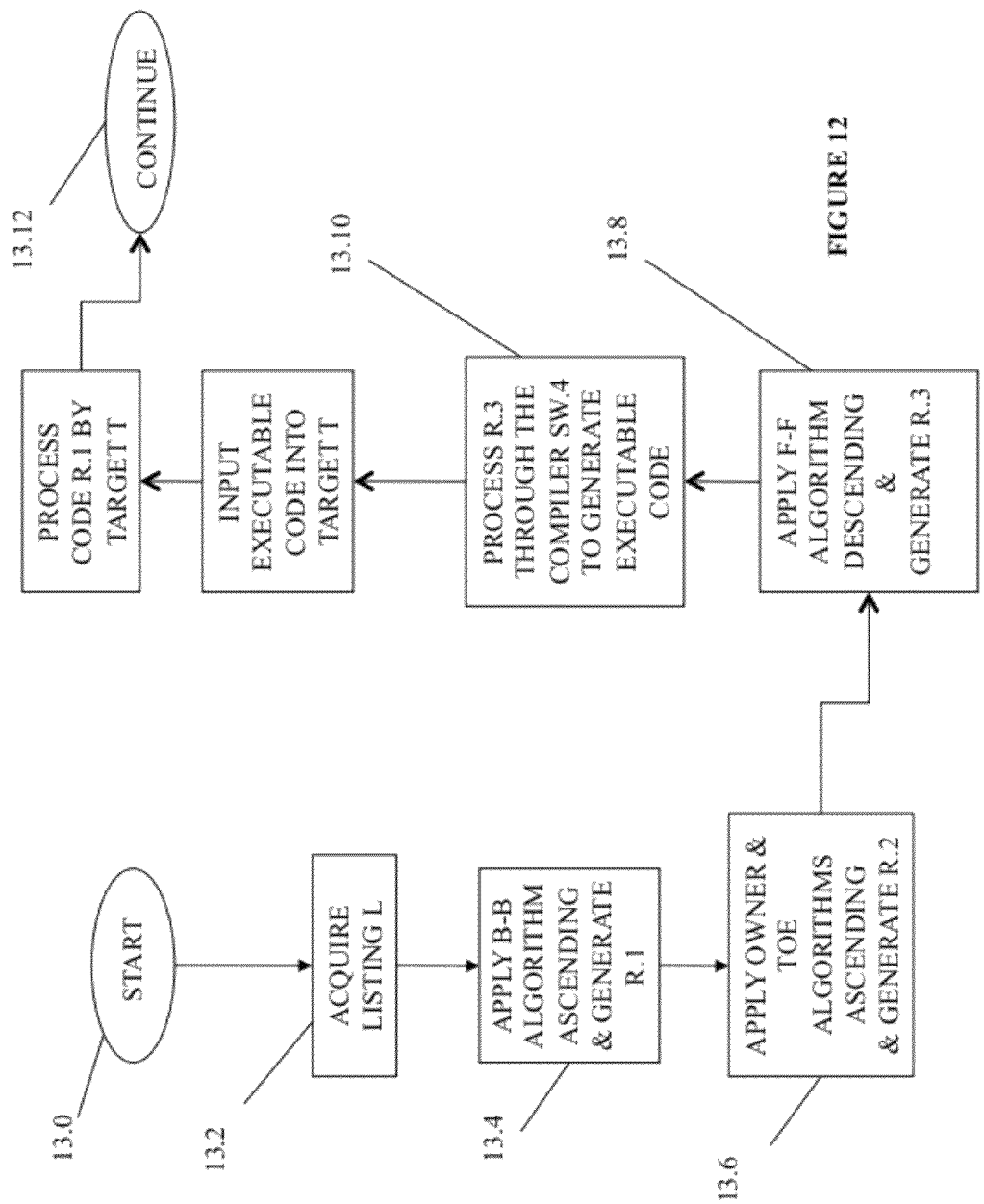
FIG. 12 is a flow chart of a successive application of the first four aspects of the invented method of FIGS. 4 through 11C to a sequential listing of software encoded instructions of FIG. 3.

FIG. 12 is a flow chart of a successive application of the first four aspects of the invented method to the sequential instructions 4000-4999 SEQ that are used to generate a final resultant code R.3. The source program SW.3 is acquired by the computer 2 or the reconfigurable computer 4 in step 13.2 The first aspect of the invented method of FIG. 6 is applied in step 13.4 to the entire instruction sequence 4000-4999 SEQ of the source program SW.3 in an ascending order from instruction 4999 to instruction 4000 to generate a first resultant code R.1, whereby the first resultant code R.1 is generated and all overlapping back branches of the source program SW.3 are transformed within the first resultant code R.1 into either nested branches or unrelated branches.

The third aspect of the invented method of FIG. 9 and the fourth aspect of the invented method of FIG. 11 are applied in step 13.6 to the entire instruction sequence 4000-4999 SEQ of the first resultant code R.1 in an ascending order from instruction 4999 to instruction 4000 to generate a second resultant code R.2, whereby overlapping forward and back branches are transformed within the second resultant code R.2 into either nested branches or unrelated branches.

The second aspect of the invented method of FIG. 7 is applied in step 13.8 to the entire instruction sequence 4000-4999 SEQ of the second resultant code R.2 in an descending order from instruction 4000 to instruction 4999 to generate a final resultant code R.3, whereby overlapping forward branches are transformed within the final resultant code R.3 into either nested branches or unrelated branches.

The final resultant code R.3 may than, in alternate variations of the process of FIG. 12, may be either delivered in step 13.10(a.) directly for execution by the target circuit T; (b.) serialized as per step 1.10 of FIG. 1F; and/or (c.) delivered to the compiler SW.4 whereby complied software-encoded instructions that are executable by the target circuit T are generated.

It is understood that the method of FIGS. 3 through 12 may be applied by the first system software SW.2 in an analogous fashion to generate the fourth ordered list L.4 in an alternate execution of step 1.08 by derivation from the third ordered list L.3, whereby all logical processing instructional content of the third ordered list L.3 that may cause overlapping branching in execution or instantiation is replaced in the fourth ordered list L.4 with associations of, and modifications to, the software objects O.1-O.N that provides equivalent logic but avoids overlapped branching.

In another alternate optional aspect of the invented method, the action of step 13.12 may be executed by (a.) serializing the fourth list L.4 to form the serialized list L.S as per step 1.10; (b.) processing the serialized list L.S by the compiler SW.4 to generate the resultant sequence SEQ.R as per step 1.12; and (c.) inputting the resultant sequence SEQ.R into the target circuit T as per step 1.14.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

I claim:

1. A method for applying a sequence of processor instructions to structure a logic circuitry, the method comprising:
   a. Deriving a plurality of software objects from the sequence of processor instructions;
   b. Associating the plurality of software objects in accordance with an original logic of the sequence of processor instructions, wherein each data dependency of the sequence of processor instructions is modeled by association within the plurality of software objects;
   c. Determining at least one memory precedence conflict within the associated plurality of software objects;
   d. Associating at least two software objects to resolve the at least one memory precedence conflict;
   e. De-overlapping the execution of the associated plurality of software objects by replacing all overlapping branch logic instructions of the associated series of software objects with equivalent and non-overlapping branch logic instructions; and
   f. Applying the de-overlapped associated plurality of software objects in a structuring of the logic circuitry.

2. The method of claim 1, further comprising:
   g. Determining a plurality of memory precedence conflicts within the associated plurality of software objects; and
   h. Resolving each memory precedence conflict by associating at least two software objects in each instance of memory precedence conflict.

3. The method of claim 1, wherein at least one function of the sequence of processor instructions is modeled by a logically equivalent software object.

4. The method of claim 1, wherein each of a plurality of functions the sequence of processor instructions is modeled by a separately addressable and logically equivalent software object.

5. The method of claim 1, further comprising storing at least one software object of the plurality of software objects in an object container prior to programming the logic circuitry.

6. The method of claim 1, wherein the sequence of instructions comprises a plurality of opcodes.

7. The method of claim 6, further comprising deriving a distinguishable logically equivalent software object from at least one opcode of the plurality of opcodes.

8. The method of claim 7, further comprising storing at least one software object of the plurality of software objects in an object container.

9. The method of claim 6, further comprising generating a distinguishable and logically equivalent software object for each opcode of the plurality of opcodes.

10. The method of claim 9, further comprising storing at least one software object of the plurality of software objects in an object container.

11. The method of claim 1, wherein at least one function is formed by at least two opcodes.

12. The method of claim 11, wherein the at least two opcodes are each modeled by a separately addressable logically equivalent software object.

13. The method of claim 1, wherein the logic circuitry comprises a dynamically reconfigurable circuitry.

14. The method of claim 1, wherein the logic circuitry comprises a dynamically reconfigurable processor.

15. The method of claim 1, wherein the logic circuitry comprises a vector processor.

16. The method of claim 1, wherein the logic circuitry comprises a digital signal processor.

17. The method of claim 1, wherein the logic circuitry comprises a programmable logic circuitry.

18. The method of claim 1, wherein the logic circuitry comprises a reconfigurable logic circuitry.

19. The method of claim 1, wherein the logic circuitry comprises at least two parallel-operable processors.

20. The method of claim 1, wherein the logic circuitry comprises at least one processors having at least to two parallel-operable cores.

* * * * *